United States Patent
Majumder et al.

(10) Patent No.: US 11,044,783 B2
(45) Date of Patent: Jun. 22, 2021

(54) DATA SERVICE AND VOICE OVER LONG TERM EVOLUTION SUPPORT IN A MULTI-SUBSCRIBER IDENTITY MODULE SYSTEM USING A SINGLE TRANSCEIVER

(71) Applicant: QUALCOMM Incorporated, San Diego, CA (US)

(72) Inventors: Anindya Majumder, San Diego, CA (US); Shivang Vyas, San Diego, CA (US); Premshankar Umasankar, San Diego, CA (US); Ravi Balasubramanian, La Jolla, CA (US); Ammar Kitabi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 16/518,672

(22) Filed: Jul. 22, 2019

(65) Prior Publication Data

US 2021/0029773 A1   Jan. 28, 2021

(51) Int. Cl.
*H04W 68/00* (2009.01)
*H04W 76/28* (2018.01)
(Continued)

(52) U.S. Cl.
CPC ....... *H04W 76/28* (2018.02); *H04W 36/0022* (2013.01); *H04W 36/14* (2013.01); *H04W 84/042* (2013.01); *H04W 88/06* (2013.01)

(58) Field of Classification Search
CPC . H04W 68/005; H04W 88/06; H04W 76/048; H04W 80/10; H04W 4/60;
(Continued)

(56) References Cited

U.S. PATENT DOCUMENTS

| 2013/0065644 A1* | 3/2013 | Bishop | H04W 8/183 |
| | | | 455/558 |
| 2013/0303203 A1* | 11/2013 | Wang | H04W 68/00 |
| | | | 455/458 |

(Continued)

FOREIGN PATENT DOCUMENTS

WO   WO-2015130689 A1   9/2015

OTHER PUBLICATIONS

International Search Report and Written Opinion—PCT/US2020/041208—ISA/EPO—dated Sep. 22, 2020.

*Primary Examiner* — Jung Liu
(74) *Attorney, Agent, or Firm* — Qualcomm Incorporated

(57) ABSTRACT

Methods, systems, and devices for wireless communications are described. A user equipment (UE) may identify that it is a multi-subscriber identity module (SIM) device that supports communications with at least a first subscription corresponding to a first SIM and a second subscription corresponding to a second SIM, where the communications are transmitted or received via a single transceiver of the UE. Accordingly, the UE may simultaneously perform packet-based voice traffic using the first subscription and data communications using the second subscription, where the data communications occur during one or more durations of time in which the packet-based voice traffic is absent. For example, the UE may transmit or receive messages using the first subscription and then transmit or receive messages using the second subscription by tuning the single transceiver away from the communications for the first subscription when the packet-based voice traffic is absent.

26 Claims, 24 Drawing Sheets

(51) Int. Cl.
*H04W 36/00* (2009.01)
*H04W 36/14* (2009.01)
H04W 84/04 (2009.01)
H04W 88/06 (2009.01)

(58) Field of Classification Search
CPC ........... H04W 68/12; H04W 12/00405; H04W 76/28; H04W 12/06; H04W 76/16; H04W 72/048; H04W 72/0453; H04W 52/0216; H04W 52/0212; H04W 72/0446; H04W 72/085; H04W 68/02; H04L 65/1069; H04L 65/1006; H04L 65/1016; Y02D 70/1262; Y02D 70/24; Y02D 70/00; Y02D 30/70

See application file for complete search history.

(56) References Cited

U.S. PATENT DOCUMENTS

| | | | |
|---|---|---|---|
| 2014/0364118 A1* | 12/2014 | Belghoul | H04L 65/1069 455/435.1 |
| 2015/0257099 A1 | 9/2015 | Su | |
| 2015/0289141 A1* | 10/2015 | Ghasemzadeh | H04W 16/14 370/330 |
| 2016/0183238 A1* | 6/2016 | Buthler | H04L 1/1887 370/329 |
| 2017/0135125 A1* | 5/2017 | Buthler | H04L 1/1887 |
| 2017/0359813 A1* | 12/2017 | Lee | H04W 52/0212 |

\* cited by examiner

DATA SERVICE AND VOICE OVER LONG TERM EVOLUTION SUPPORT IN A MULTI-SUBSCRIBER IDENTITY MODULE SYSTEM USING A SINGLE TRANSCEIVER

BACKGROUND

The following relates generally to wireless communications, and more specifically to a multi-subscriber identity module (SIM) system.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Accordingly, the communications may be performed on different subscriptions supported by a UE and base station, the subscriptions based on corresponding SIMs. For example, the different subscriptions (and the corresponding SIMs) may enable a UE to connect to different wireless networks and services. The UE may utilize the different subscriptions through respective SIMs (e.g., SIM cards) within the UE (e.g., inserted, built in, etc.), where the SIMs store network-specific information used to authenticate and identify subscribers (e.g., UEs) on a corresponding wireless network. Efficient techniques are desired to enable the UE to communicate in a multi-SIM system.

SUMMARY

The described techniques relate to improved methods, systems, devices, and apparatuses that support data service and voice over long term evolution (VoLTE) in a multi-subscriber identity module (SIM) system using a single transceiver. Generally, the described techniques provide for a user equipment (UE) to identify that it is a multi-SIM device that supports communications with at least a first subscription corresponding to a first SIM and a second subscription corresponding to a second SIM, where the communications are transmitted or received via a single transceiver of the UE. Accordingly, the UE may simultaneously perform packet-based voice traffic (e.g., a VoLTE call) using the first subscription and data communications using the second subscription, where the data communications occur during one or more durations of time in which the packet-based voice traffic is absent. For example, the UE may transmit or receive messages using the first subscription and then transmit or receive messages using the second subscription by tuning the single transceiver away (e.g., via a tune-away (TA) mechanism) from the communications for the first subscription when the packet-based voice traffic is absent.

Additionally, the UE may communicate with the first subscription while monitoring paging occasions during an idle mode on the second subscription to identify incoming communications (e.g., additional voice traffic, messages, etc.) and may provide an option of accepting or rejecting the incoming communications. Based on a configuration of the UE, the UE may be able to receive communications using the first subscription, or using the second subscription, or using both subscriptions. For example, the UE may support either a single receive dual service dual standby (SR-DSDS) mode and/or a dual receive dual service dual standby (DR-DSDS) mode. With the SR-DSDS mode, the UE may prioritize communications for one subscription over the other subscription, but have the ability to raise the priority of the second subscription based on consecutive denials for the second subscription and switch communications from the first subscription to the second subscription after the consecutive denials reaches a threshold value. Additionally or alternatively, with the DR-DSDS mode, the UE may receive communications for both subscriptions but transmit communications using one subscription at a time.

A method of wireless communications at a UE is described. The method may include identifying that the UE is a multi-SIM device that supports communications in accordance with at least a first subscription corresponding to a first SIM and a second subscription corresponding to a second SIM, where the communications are transmitted or received via a single transceiver of the UE, communicating, via the single transceiver, first data traffic using the first subscription, the first data traffic including packet-based voice traffic within a first data traffic stream, identifying that the first data traffic stream includes one or more durations of time in which the packet-based voice traffic is absent, and communicating, via the single transceiver and during the one or more durations of time, second data traffic using the second subscription.

An apparatus for wireless communications at a UE is described. The apparatus may include a processor, memory coupled with the processor, and instructions stored in the memory. The instructions may be executable by the processor to cause the apparatus to identify that the UE is a multi-SIM device that supports communications in accordance with at least a first subscription corresponding to a first SIM and a second subscription corresponding to a second SIM, where the communications are transmitted or received via a single transceiver of the UE, communicate, via the single transceiver, first data traffic using the first subscription, the first data traffic including packet-based voice traffic within a first data traffic stream, identify that the first data traffic stream includes one or more durations of time in which the packet-based voice traffic is absent, and communicate, via the single transceiver and during the one or more durations of time, second data traffic using the second subscription.

Another apparatus for wireless communications at a UE is described. The apparatus may include means for identifying that the UE is a multi-SIM device that supports communications in accordance with at least a first subscription corresponding to a first SIM and a second subscription corresponding to a second SIM, where the communications are transmitted or received via a single transceiver of the UE, communicating, via the single transceiver, first data traffic using the first subscription, the first data traffic including packet-based voice traffic within a first data traffic stream, identifying that the first data traffic stream includes one or more durations of time in which the packet-based voice traffic is absent, and communicating, via the single transceiver and during the one or more durations of time, second data traffic using the second subscription.

A non-transitory computer-readable medium storing code for wireless communications at a UE is described. The code may include instructions executable by a processor to identify that the UE is a multi-SIM device that supports communications in accordance with at least a first subscription corresponding to a first SIM and a second subscription corresponding to a second SIM, where the communications are transmitted or received via a single transceiver of the UE, communicate, via the single transceiver, first data traffic using the first subscription, the first data traffic including packet-based voice traffic within a first data traffic stream, identify that the first data traffic stream includes one or more durations of time in which the packet-based voice traffic is absent, and communicate, via the single transceiver and during the one or more durations of time, second data traffic using the second subscription.

Some examples of the method, apparatuses, and non-transitory computer-readable medium described herein may further include operations, features, means, or instructions for communicating the first data traffic based on an active duration of a connected mode discontinuous reception (cDRX) cycle for the first data traffic stream, and communicating the second data traffic based on a sleep duration of the cDRX cycle for the first data traffic stream, where the sleep duration includes the one or more durations of time in which the packet-based voice traffic may be absent.

Some examples of the method, apparatuses, and non-transitory computer-readable medium described herein may further include operations, features, means, or instructions for transitioning into the sleep duration based on an inactivity timer expiring while in a listen mode of the cDRX cycle.

In some examples of the method, apparatuses, and non-transitory computer-readable medium described herein, the active duration includes a talk mode of the cDRX cycle, a semi-persistent scheduling (SPS) subframe, or a combination thereof, and the sleep duration includes an inactive portion of the cDRX cycle.

Some examples of the method, apparatuses, and non-transitory computer-readable medium described herein may further include operations, features, means, or instructions for communicating the first data traffic based on an active duration of a silence indicator descriptor (SID) frame for the first data traffic stream, where the first data traffic includes SID transmissions, and communicating the second data traffic based on a silence duration of the SID frame for the first data traffic stream, where the silence duration includes the one or more durations of time in which the packet-based voice traffic may be absent.

Some examples of the method, apparatuses, and non-transitory computer-readable medium described herein may further include operations, features, means, or instructions for receiving a paging indication for a third data traffic using the second subscription, the third data traffic including packet-based voice traffic, and placing the first data traffic stream on hold based on receiving the paging indication.

Some examples of the method, apparatuses, and non-transitory computer-readable medium described herein may further include operations, features, means, or instructions for transmitting one or more uplink transmissions for the first data traffic, and transmitting one or more uplink transmissions for the second data traffic by tuning the single transceiver away from the first data traffic stream during the one or more durations of time in which the packet-based voice traffic may be absent.

Some examples of the method, apparatuses, and non-transitory computer-readable medium described herein may further include operations, features, means, or instructions for initiating a handover procedure from a first radio access technology (RAT) to a second RAT for the first data traffic based on a circuit switched fallback (CSFB) procedure, a simultaneous voice and long term evolution (SVLTE) procedure, or a combination thereof, the second RAT supporting fewer features than the first RAT, and suspending the second data traffic based on the handover procedure.

In some examples of the method, apparatuses, and non-transitory computer-readable medium described herein, the handover procedure includes a single radio voice call continuity (SRVCC) handover procedure.

In some examples of the method, apparatuses, and non-transitory computer-readable medium described herein, communicating the second data traffic using the second subscription may include operations, features, means, or instructions for monitoring for one or more paging occasions for a third data traffic using the second subscription, the third data traffic including packet-based voice traffic, a mobile terminal (MT) page reception, or a combination thereof.

Some examples of the method, apparatuses, and non-transitory computer-readable medium described herein may further include operations, features, means, or instructions for receiving downlink traffic for the first data traffic and downlink traffic for the second data traffic based on a DR-DSDS mode of the UE.

Some examples of the method, apparatuses, and non-transitory computer-readable medium described herein may further include operations, features, means, or instructions for transmitting uplink traffic for the first data traffic during the active duration, and refraining from receiving downlink traffic associated with the one paging occasion for the third data traffic based on transmitting the uplink traffic for the first data traffic.

Some examples of the method, apparatuses, and non-transitory computer-readable medium described herein may further include operations, features, means, or instructions for prioritizing one of the first data traffic or the third data traffic based on a SR-DSDS mode of the UE, communicating the prioritized data traffic, and refraining from communicating the data traffic that may be not prioritized.

Some examples of the method, apparatuses, and non-transitory computer-readable medium described herein may further include operations, features, means, or instructions for increasing a priority of the third data traffic after a threshold value of a number of communications for the third data traffic may have been refrained from communications, and communicating the third data traffic based on the increased priority.

Some examples of the method, apparatuses, and non-transitory computer-readable medium described herein may further include operations, features, means, or instructions for receiving a paging message for a third data traffic during communications of the first data traffic, the third data traffic including a MT paging message indicating a MT call or short messaging service (SMS) reception, performing a connection establishment procedure for the third data traffic, activating a cDRX cycle for the third data traffic, and switching from communicating the first data traffic to communicating the third data traffic.

In some examples of the method, apparatuses, and non-transitory computer-readable medium described herein, the UE may be operating in SR-DSDS mode.

In some examples of the method, apparatuses, and non-transitory computer-readable medium described herein, the UE may be operating in DR-DSDS mode.

In some examples of the method, apparatuses, and non-transitory computer-readable medium described herein, the first data traffic includes a VoLTE service.

In some examples of the method, apparatuses, and non-transitory computer-readable medium described herein, the first data traffic and the second data traffic include a same RAT or different RATs.

DETAILED DESCRIPTION

Figure 1:
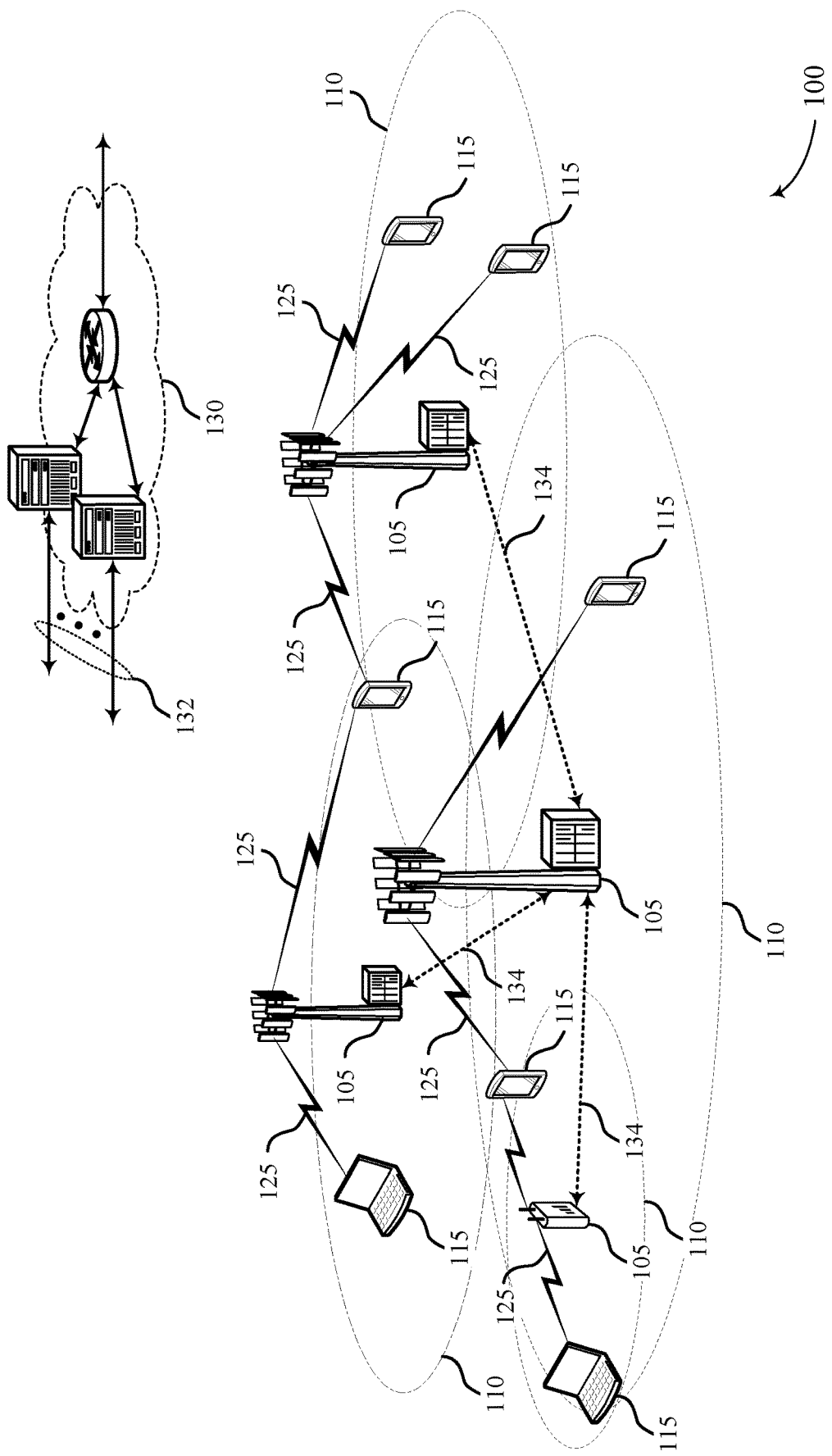
FIG. 1 illustrates an example of a system for wireless communications that supports data service and voice over long term evolution (VoLTE) support in a multi-subscriber identity module (SIM) system using a single transceiver in accordance with aspects of the present disclosure.

In some wireless communications systems, communications may occur between a user equipment (UE) and a base station according to different subscriptions supported by the UE and the base station, the subscriptions based on corresponding subscriber identity modules (SIMs). For example, the different subscriptions (and the corresponding SIMs) may enable a UE to connect to different wireless networks and services. In some cases, the UE may support a multi-SIM configuration, where two (e.g., or more) different subscriptions are supported on the same UE which are based on two separate SIMs. Additionally, these different subscriptions may be on a same radio network or different radio networks, and, even when on the same radio network, the different subscriptions may include different subscription profiles and quality of service (QoS) parameters. In some cases, the different subscriptions may also be camped on and provide services on same or different radio access technologies (RATs). As such, multi-SIM solutions may also be considered as concurrent RAT (CRAT) solutions.

Generally, CRAT solutions may use a lesser number of resources while performing operations on two different RATs than a number of resources needed by two independent solutions. Accordingly, the goal of CRAT solutions may include optimizing resource (e.g., radio frequency (RF) resources, millions of instructions per second (MIPs), etc.) usage to provide a best user experience. In some cases, different classes of CRAT solutions may utilize a dual transceiver which can provide a dual service (e.g., dual SIM, dual receive, dual transmit, etc.) dual access (DSDA) mode, while other classes of CRAT solutions may share a single transceiver where two subscriptions share the same radio resources. However, dual access modes may require a higher number of RF resources and a higher baseband hardware support that increases the cost for building a UE with a dual transceiver. Due to the higher costs and power consumption considerations, dual subscription devices and solutions may use the shared single transceiver. As such, the CRAT solutions for multi-SIM operations may need to be optimized to provide a satisfactory user experience with both subscriptions sharing the radio resources.

As described herein, a UE may simultaneously perform a voice over long term evolution (VoLTE) call (e.g., first data traffic) on a first subscription and data reception/transmission (e.g., second data traffic) on a second subscription using a single transceiver. For example, the UE may use voice spurt-silence patterns of conversational voice models, network deployment of VoLTE, scheduling and periodicity of speech frames and bursty traffic of most mobile data applications to facilitate the simultaneous communications using the two subscriptions. Additionally, while on the VoLTE call on the first subscription, the UE may monitor idle mode paging occasions on the second subscription and provide an alert (e.g., to a user operating the UE) of an incoming communication (e.g., a second call, message, data transmission, etc.) on the second subscription, thereby providing an option (e.g., to the user) of accepting or rejecting the incoming communication on a separate subscription.

Aspects of the disclosure are initially described in the context of a wireless communications system. Additionally, aspects of the disclosure are illustrated by an additional wireless communications system, a delay graph, a connected mode discontinuous reception (cDRX) cycle, a UE power state distribution, packet-based voice traffic, TA mechanisms for cDRX configurations and silence insertion descriptor (SID) frames, dual receive dual service dual standby (DR-DSDS) modes for cDRX configurations and SID frames, paging monitoring configurations, flowcharts, and process flows. Aspects of the disclosure are further illustrated by and described with reference to apparatus diagrams, system diagrams, and flowcharts that relate to data service and VoLTE support in a multi-SIM system using a single transceiver.

FIG. 1 illustrates an example of a wireless communications system 100 that supports data service and VoLTE in a multi-SIM system using a single transceiver in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200 \, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

As described herein, communications may occur between a UE 115 and a base station 105 according to different subscriptions supported by the UE 115 and the base station 105, the subscriptions based on corresponding SIMs. In some cases, the UE 115 may support a multi-SIM configuration, where two (e.g., or more) different subscriptions are supported on the same UE 115 which are based on two separate SIMs. Additionally, the different subscriptions may be camped on and provide services on same or different RATs, such that multi-SIM solutions and scenarios may also be considered as concurrent RAT (CRAT) solutions or scenarios. Generally, CRAT solutions may use a lesser number of resources while performing operations on two different RATs than a number of resources needed by two independent solutions. Due to the higher costs and power consumption considerations of other solutions, multi-SIM UEs 115 and CRAT solutions may use a shared single transceiver for communications on the different subscriptions. As such, the CRAT solutions for multi-SIM operations may need to be optimized to provide a satisfactory user experience with both subscriptions sharing the radio resources.

Wireless carriers may support billions of hours of voice calls each day. Conventionally, some wireless networks (e.g., LTE networks) have served voice calls through a circuit switched fallback (CSFB) procedure to networks that operate under previous RATs (e.g., second generation (2G) communications, third generation (3G) communications, etc.), through a simultaneous voice and LTE (SVLTE) procedure, or a combination thereof. However, based on an extensive deployment of VoLTE, voice service over packet switched LTE networks has become more common. Additionally, deployment of VoLTE on LTE networks is rapidly expanding due to better spectral efficiency for voice calls, power optimization, and synergies of operation with other types of communications (e.g., voice over Wi-Fi (VoWiFi)), which may allow a more efficient usage of network resources. Based on the expansion of VoLTE deployments, VoLTE calls have become more desirable (e.g., a de-facto and cost-efficient method of providing voice services for operators).

Additionally, some wireless communications system deployments (e.g., fifth generation (5G) or NR) have also expanded aggressively, resulting in CRAT solutions that may consist of a combination of the wireless communications system deployments and previous wireless communications systems (e.g., 5G+4G/3G/2G RATs) for multi-SIM combinations. For example, a combination of a 5G system and a fourth generation (4G) system (e.g., a 5G+4G combination) may be used based on carriers having robust deployments in most global regions for the 4G system (e.g., LTE) while also including carriers with primary data subscriptions on the 5G system, where the 5G system may be desirable for data transmissions due to a better spectral usage and service for data services. Accordingly, in the 5G+4G combination, voice calls may occur on a 4G non-data distribution service (DDS) subscription (e.g., VoLTE calls). As such, a combination of the 5G system for data and the 4G VoLTE system for voice calls may be expected to be used as a mode of operation for UEs 115 that use 5G multi-SIM data deployments. However, conventionally, the UE 115 may switch between two subscriptions associated with the different RATs/wireless communication system deployments as needed for the appropriate communications (e.g., a first subscription associated with 4G for the VoLTE calls and a second subscription associated with 5G for data), which may inefficiently use battery power, frequency resources, etc.

Wireless communications system 100 may support simultaneous communications on different subscribers in a multi-SIM system. For example, a UE 115 may perform a VoLTE call (e.g., first data traffic) on a first subscription and data reception/transmission (e.g., second data traffic) on a second subscription using a single transceiver. Accordingly, the UE 115 may use voice spurt-silence patterns of conversational voice models, network deployment of VoLTE, scheduling and periodicity of speech frames and bursty traffic of most mobile data applications to facilitate the simultaneous communications using the two subscriptions. Additionally, while on the VoLTE call on the first subscription, the UE 115 may monitor idle mode paging occasions on the second subscription and provide an alert (e.g., to a user operating the UE 115) of an incoming communication (e.g., a second call, message, data transmission, etc.) on the second subscription, thereby providing an option (e.g., to the user) of accepting or rejecting the incoming communication on a separate subscription.

Figure 2:
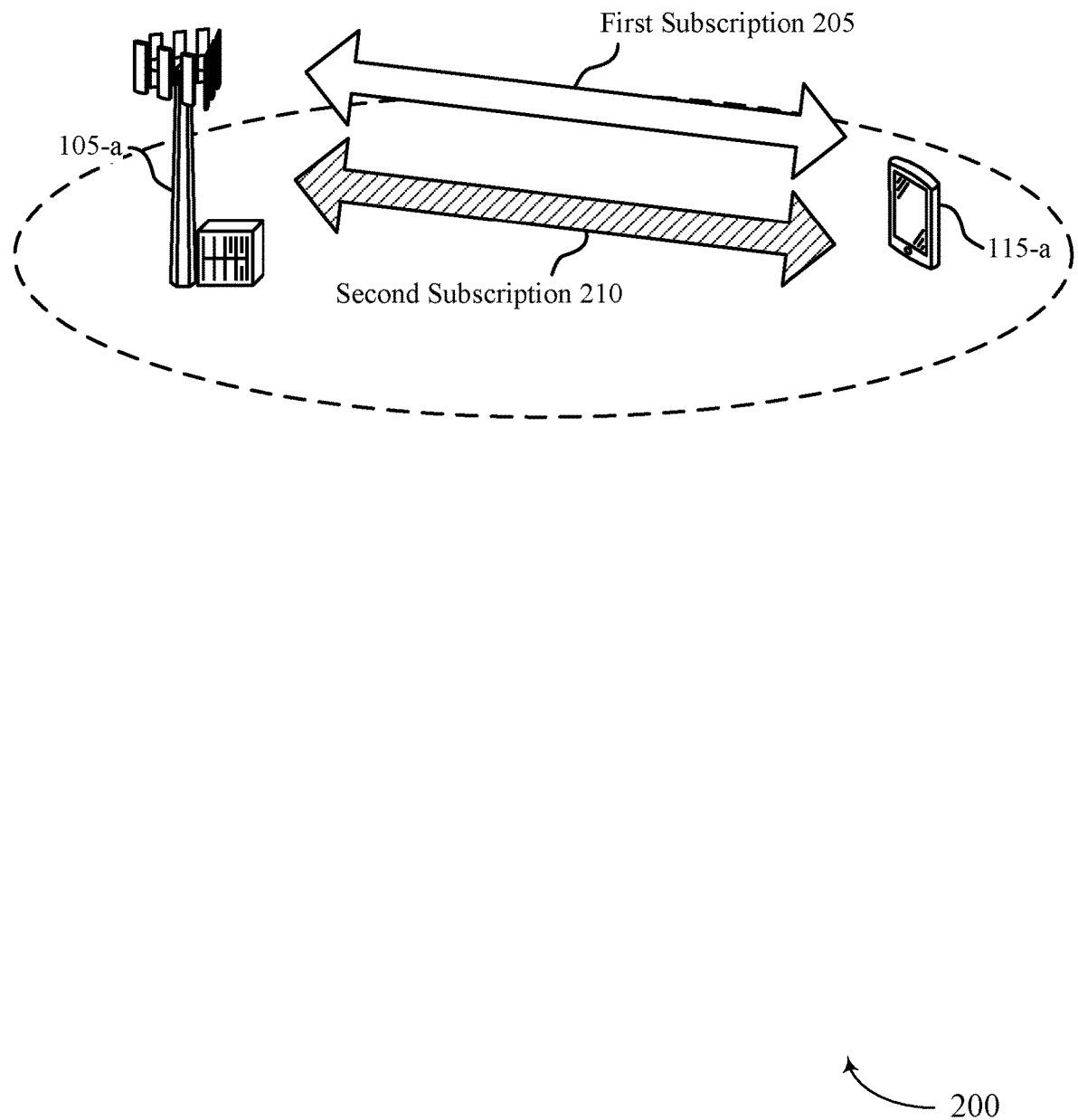
FIG. 2 illustrates an example of a wireless communications system that supports data service and VoLTE in a multi-SIM system using a single transceiver in accordance with aspects of the present disclosure.

FIG. 2 illustrates an example of a wireless communications system 200 that supports data service and VoLTE in a multi-SIM system using a single transceiver in accordance with aspects of the present disclosure. In some examples, wireless communications system 200 may implement aspects of wireless communications system 100. Wireless communications system 200 may include a UE 115-*a* and a base station 105-*a*, which may be examples of UEs 115 and base stations 105, respectively, as described above with reference to FIG. 1.

As described herein, UE 115-*a* may be a multi-SIM device that supports communications in accordance with a first subscription 205 corresponding to a first SIM and a second subscription 210 corresponding to a second SIM. In some cases, UE 115-*a* may use a single transceiver for the communications in accordance with first subscription 205 and second subscription 210. While UE 115-*a* is shown communicating with a same base station 105-*a* for both subscriptions (e.g., base station 105-*a* may include separate cells for the different subscriptions and, as such, support both subscriptions), UE 115-*a* may communicate with a first base station 105 using first subscription 205 and a second base station 105 using second subscription 210.

Accordingly, UE 115-*a* may support data service and VoLTE calls in a multi-SIM system using the single transceiver via first subscription 205 (e.g., for the VoLTE calls) and second subscription 210 (e.g., for the data service). For example, UE 115-*a* may simultaneously perform packet-based voice traffic (e.g., VoLTE calls) using first subscription 205 and data communications (e.g., data service) using second subscription 210. In some cases, the data communications may occur during one or more durations of time in which the packet-based voice traffic is absent. For example, the UE may perform the packet-based voice traffic (e.g., transmit or receive messages) using first subscription 205 and then transmit or receive messages (e.g., data communications, data service, etc.) using second subscription 210 by tuning the single transceiver away (e.g., via a tune-away (TA) mechanism) from frequencies used for the packet-based voice traffic on first subscription 205 to frequencies for the data communications on second subscription 210 when the packet-based voice traffic is absent. In some cases, the packet-based voice traffic may be absent during an inactive or sleep duration of a cDRX cycle and/or during a silence duration of a SID frame, and UE 115-*a* may communicate using second subscription 210 during these durations.

Additionally, UE 115-*a* may communicate with first subscription 205 while monitoring paging occasions during an idle mode on second subscription 210 to identify incoming communications (e.g., additional voice traffic, messages, etc.) and may provide an option of accepting or rejecting the incoming communications. Based on a configuration of UE 115-*a*, UE 115-*a* may be able to receive communications using first subscription 205, or using second subscription 210, or using both subscriptions. For example, UE 115-*a* may support a single receive dual service dual standby (SR-DSDS) mode and/or a dual receive dual service dual standby (DR-DSDS) mode. With the SR-DSDS mode, UE 115-*a* may prioritize communications for one subscription (e.g., first subscription 205) over the other subscription (e.g., second subscription 210) for receiving communications, but have the ability to raise the priority of the other (e.g., lower prioritized) subscription based on consecutive denials for the other subscription. Accordingly, UE 115-*a* may switch communications from the prioritized subscription to the other subscription after the consecutive denials reaches a threshold value. Additionally or alternatively, with the DR-DSDS mode, UE 115-*a* may receive communications for both subscriptions but transmit communications using one subscription at a time.

Figure 3A:
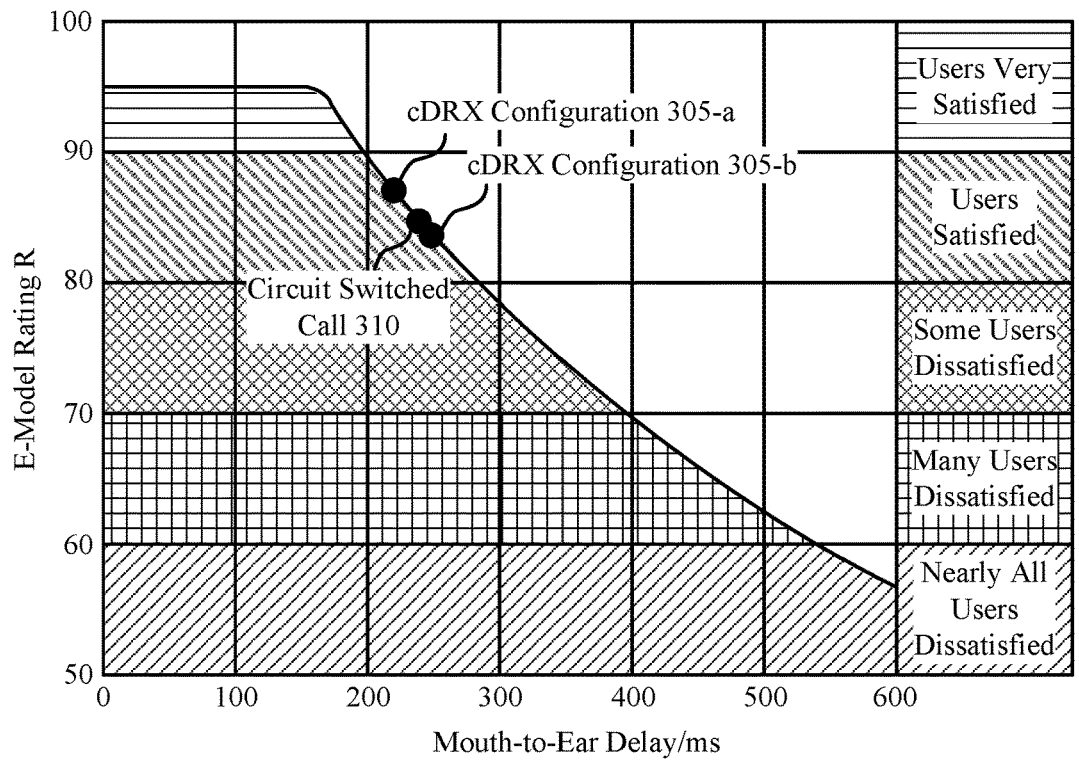
FIG. 3A illustrates an example of a delay graph that supports data service and VoLTE in a multi-SIM system using a single transceiver in accordance with aspects of the present disclosure.

FIG. 3A illustrates an example of a delay graph 300 that supports data service and VoLTE in a multi-SIM system using a single transceiver in accordance with aspects of the present disclosure. In some examples, delay graph 300 may implement aspects of wireless communications systems 100 and/or 200. Delay graph 300 may illustrate mouth-to-ear delays expected for a cDRX configuration associated with a subscription that supports VoLTE calls (e.g., 4G/LTE).

In some voice call modeling representations, conversational voice calls may be considered in a TALK Spurt mode for 50% of the time and in LISTEN mode for the remaining 50% of the time. Other voice call modeling representations may consider a typical voice call to have 23% talk, 23% listen time, and 54% silence time during the call. In some networks, adaptive multi-rate (AMR) audio codecs may be used during voice call for encoding and/or decoding audio (e.g., audio packets) to transmit/receive the audio for the voice call. AMR wideband (AMR-WB) codec rates may vary between 6.6-23.8 kilobytes per second (kbps), which can dynamically adapt based on channel conditions. Assuming a typical 12.2 kbps AMR WB codec rate, in a LISTEN state, a voice over Internet Protocol (VoIP) packet of 244 bits (31 bytes) may be generated every 20 ms on downlink, and an SID packet of five (5) bytes may be generated every 160 ms on uplink in the LISTEN state. Additionally or alternatively, in a TALK state, the VoIP packet of 244 bits may be generated every 20 ms on the uplink, and an SID packet of five (5) bytes may be generated every 160 ms on the downlink. In some cases, SID may be a payload used to convey "comfort noise" for periods of silence in a conversation.

Accordingly, an actual data rate needed for transmission of the VoIP packets during a VoLTE call may be quite low. However, cDRX configurations, which are used by networks to transmit this voice data (e.g., VoIP packet, audio, packet-based voice traffic, etc.), may be dictated by a key factor known as mouth-to-ear delay. The mouth-to-ear delay may determine how frequently VoIP packets need to be transmitted while maintaining an acceptable voice quality (e.g., as shown by an E-model rating (R) that indicates voice quality). Additionally, the mouth-to-ear delay may be a factor of overall network delay, some of which is contributed by the wireless communications network for the voice call (e.g., a 4G/LTE radio access network (RAN)).

As shown in FIG. 3A, a relationship between different cDRX configurations (e.g., cDRX configuration 305-*a* and 305-*b*) used and the mouth-to-ear delay may be determined for different voice quality levels (e.g., R values) and corresponding satisfaction levels for users at the different voice quality levels. In some cases, mouth-to-ear delays may also be impacted by overall network data loading based on how the additional signaling in the network impacts scheduling rates. cDRX configuration 305-*a* may represent a 20 ms cDRX configuration, and cDRX configuration 305-*b* may represent a 40 ms cDRX configuration (e.g., 40 ms cycles for receiving data/messages). As shown, typical mouth-to-ear delays for cDRX configuration 305-*a* (e.g., the 20 ms cDRX configuration) may be about 225 ms, and typical mouth-to-ear delays for cDRX configuration 305-*b* (e.g., the 40 ms cDRX configuration) may be about 250 ms. Anything below 300 ms may be considered very acceptable, where humans cannot sense the delay. Additionally, typical mouth-to-ear delays for a circuit switched call 310 may be about 245 ms. cDRX configuration 305-*b* may be comparable to circuit switched call 310, and cDRX configuration 305-*a* may include a negligible advantage for a mouth-to-ear delay based on cDRX configuration 305-*b* still meeting the acceptable range and using less processing power (e.g., based on the longer cycle duration resulting in less often receptions). As such, cDRX configuration 305-*b* (e.g., 40 ms cDRX cycle) may be used for packet-based voice traffic as described herein.

Figure 3B:
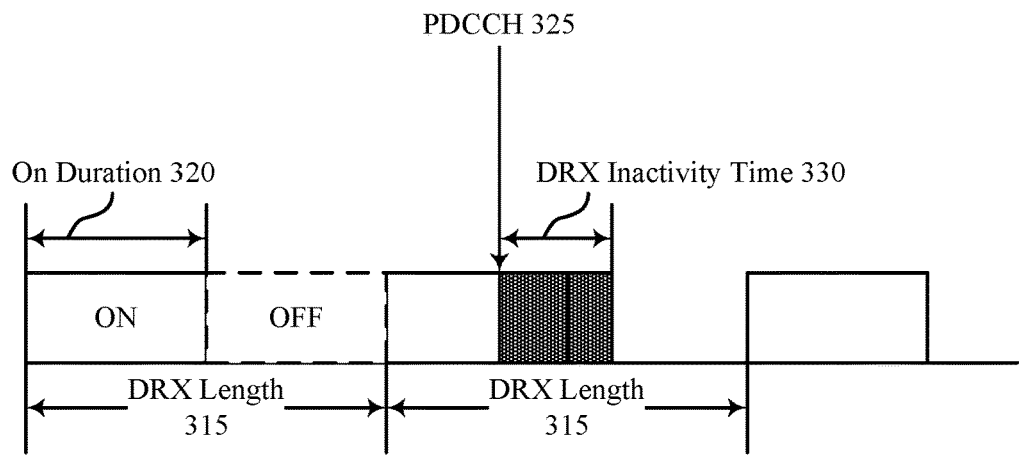
FIG. 3B illustrates an example of a connected mode discontinuous reception (cDRX) cycle that supports data service and VoLTE in a multi-SIM system using a single transceiver in accordance with aspects of the present disclosure.

FIG. 3B illustrates an example of a cDRX 301 that supports data service and VoLTE in a multi-SIM system using a single transceiver in accordance with aspects of the present disclosure. In some examples, cDRX 301 may implement aspects of wireless communications systems 100 and/or 200.

cDRX 301 may be implemented as a power saving mechanism so that a UE 115 (e.g., or similar device) does not have to stay awake and decode downlink channels (e.g., physical downlink control channels (PDCCHs) on every sub frame, especially when the network has no data to send. cDRX (e.g., or discontinuous reception (DRX)) configurations may include the following parameters as shown in Table 1.

TABLE 1 cDRX Configuration Properties

| DRX Parameter | Description |
| --- | --- |
| DRX length 315 | Each period where the device cyclically wakes up and sleeps, total of ON time plus OFF (sleep) time in each cycle |
| ON duration timer 320 | Duration of "ON time" in each DRX cycle |
| Inactivity timer 330 | Defines the duration the device should stay ON after the reception of PDCCH 325, before sleeping. |

Since using a 40 ms cDRX configuration (e.g., cDRX configuration 305-*b* as shown in FIG. 3A) may allow a mouth-to-ear delay that is nearly as good as circuit switched calls, most networks may use 40 ms cDRX configurations in VoLTE calls.

Figure 4:
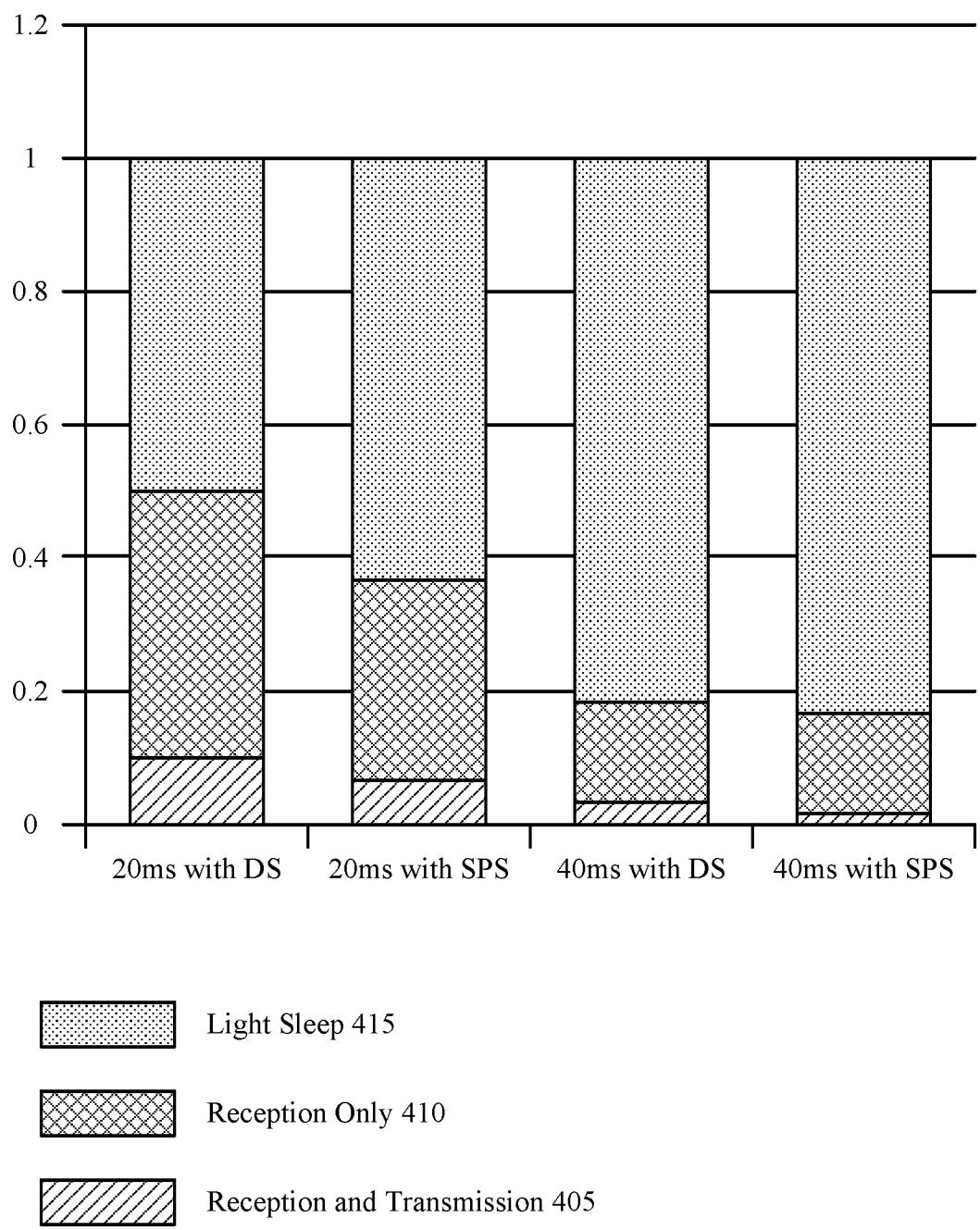
FIG. 4 illustrates an example of a user equipment (UE) power state distribution that supports data service and VoLTE in a multi-SIM system using a single transceiver in accordance with aspects of the present disclosure.

FIG. 4 illustrates an example of a UE power state distribution 400 that supports data service and VoLTE in a multi-SIM system using a single transceiver in accordance with aspects of the present disclosure. In some examples, UE power state distribution 400 may implement aspects of wireless communications systems 100 and/or 200.

Codecs for data transmissions and receptions, including AMR-WB codecs used in VoLTE calls, may involve a discontinuous transmission (DTX) cycle with voice activity detection, silence description (e.g., as indicated by SID frames), and comfort noise generation to fill in the speech pauses. When speech pause or inactivity is detected by the encoder, no speech frames may be transmitted, transmission may be paused to save battery life, overall network interference may be reduced, and loading on all links may be reduced. A receiving decoder may then fill the pauses as indicated by the SID frames with comfort noise to reduce the contrast between silence and background noise in actual speech frames.

Additionally, when voice inactivity is detected, a UE 115 (e.g., a transmitter) may send a SID_UPDATE message to convey the comfort noise parameters. Typically, the UE 115 may transmit the SID_UPDATE message once every 160 ms. Accordingly, when no voice activity is detected and SID frames are active either on uplink or downlink, no uplink or downlink activity may be present within the 160 ms periodicity, and the comfort noise may be used (e.g., according to the comfort noise parameters).

As shown in FIG. 4, a UE 115 (e.g., layer 1 of the UE 115) may be in a light sleep 415 nearly 80% of the time while in a VoLTE call for dual service (DS) (e.g., 50% TALK time and 50% LISTEN time) with a 40 ms cDRX configuration. Additionally, a percentage of time in the light sleep 415 for a 40 ms cDRX configuration (e.g., cycle) with semi persistent scheduling (SPS) (e.g., and a 4 ms ON duration and a 4 ms Inactivity timer) and with 50% LISTEN and 50% TALK may also be found to be greater than 80%. Light sleep 415 here may be defined as a state where the UE 115 is not monitoring downlink channels (e.g., reception only 410) or transmitting on uplink channels (e.g., transmission, reception and transmission 405, etc.). Accordingly, the UE 115 may turn both reception and transmission to OFF. For other configurations (e.g., that include a 40 ms cDRX cycle, a 2 ms ON duration, and a 2 ms inactivity timer), the average sleep time (e.g., light sleep 415) may be found to be higher than 80% of a VoLTE call duration. Additionally, as shown, cDRX configurations with a 20 ms cycle duration (e.g., 20 ms with DS and 20 ms with SPS) may be in light sleep 415 50% to about 60% of a VoLTE call duration.

Figure 5:
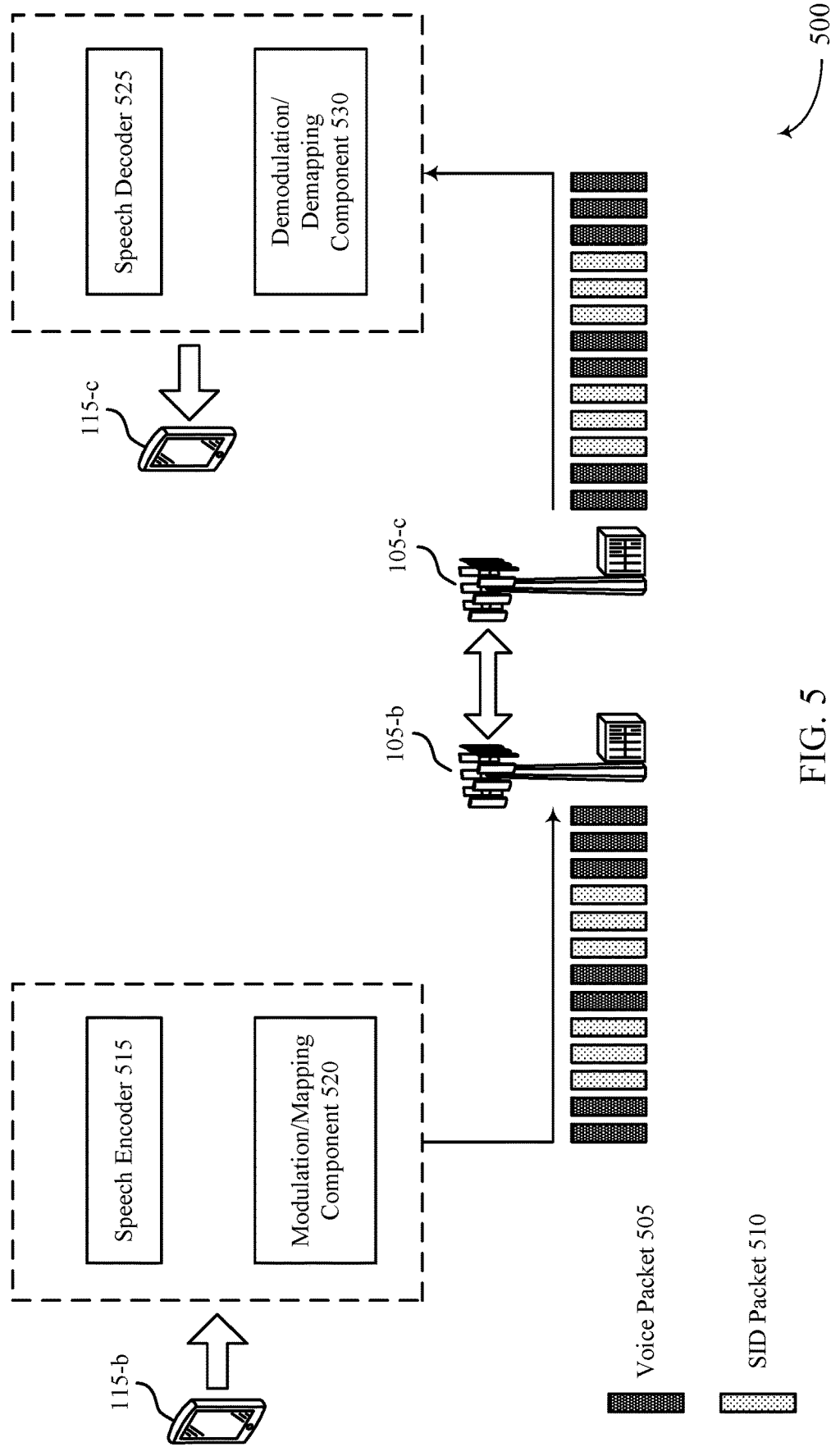
FIG. 5 illustrates an example of packet-based voice traffic that supports data service and VoLTE in a multi-SIM system using a single transceiver in accordance with aspects of the present disclosure.

FIG. 5 illustrates an example of packet-based voice traffic 500 that supports data service and VoLTE in a multi-SIM system using a single transceiver in accordance with aspects of the present disclosure. In some examples, packet-based voice traffic 500 may implement aspects of wireless communications systems 100 and/or 200. Packet-based voice traffic 500 may include a UE 115-*b*, a UE 115-*c*, a base station 105-*b*, and a base station 105-*c*, which may be examples of corresponding UEs 115 and base stations 105, respectively, as described herein. Packet-based voice traffic 500 may illustrate a high level end-to-end flow of VoIP packets during a VoLTE call, with a mix of voice packets 505 and SID packets 510 (e.g., audio packets).

As an example, UE 115-*b* may be a transmitter during the VoLTE call, and UE 115-*c* may be a receiver during the VoLTE call. Accordingly, UE 115-*b* may include a speech encoder 515 and a modulation/mapping component 520 to encode and modulate (e.g., based on an AMR-WB audio codec) the voice packets 505 and SID packets 510 prior to transmitting the audio packets to UE 115-*c*. Subsequently, the packets may pass through base station 105-*b* and base station 105-*c* before getting to UE 115-*c*. UE 115-*c* may then use a speech decoder 525 and a demodulation/demapping component 530 to demodulate and decode the audio packets to receive the VoLTE call. In some cases, base station 105-*b* and base station 105-*c* may communicate over an LTE network, and base station 105-*c* may transmit the audio packets to UE 115-*c* via a core network.

Figure 6A:
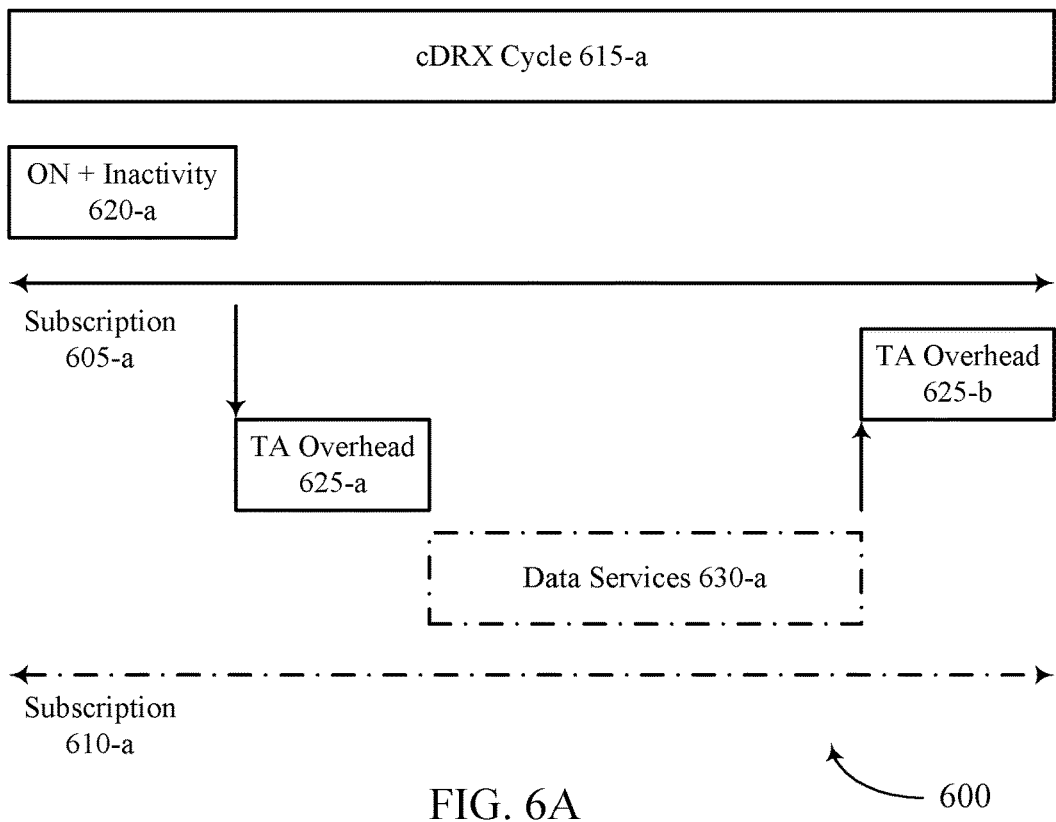
FIGS. 6A and 6B illustrate examples of tune-away (TA) mechanisms for cDRX configurations that support data service and VoLTE in a multi-SIM system using a single transceiver in accordance with aspects of the present disclosure.
Figure 6B:
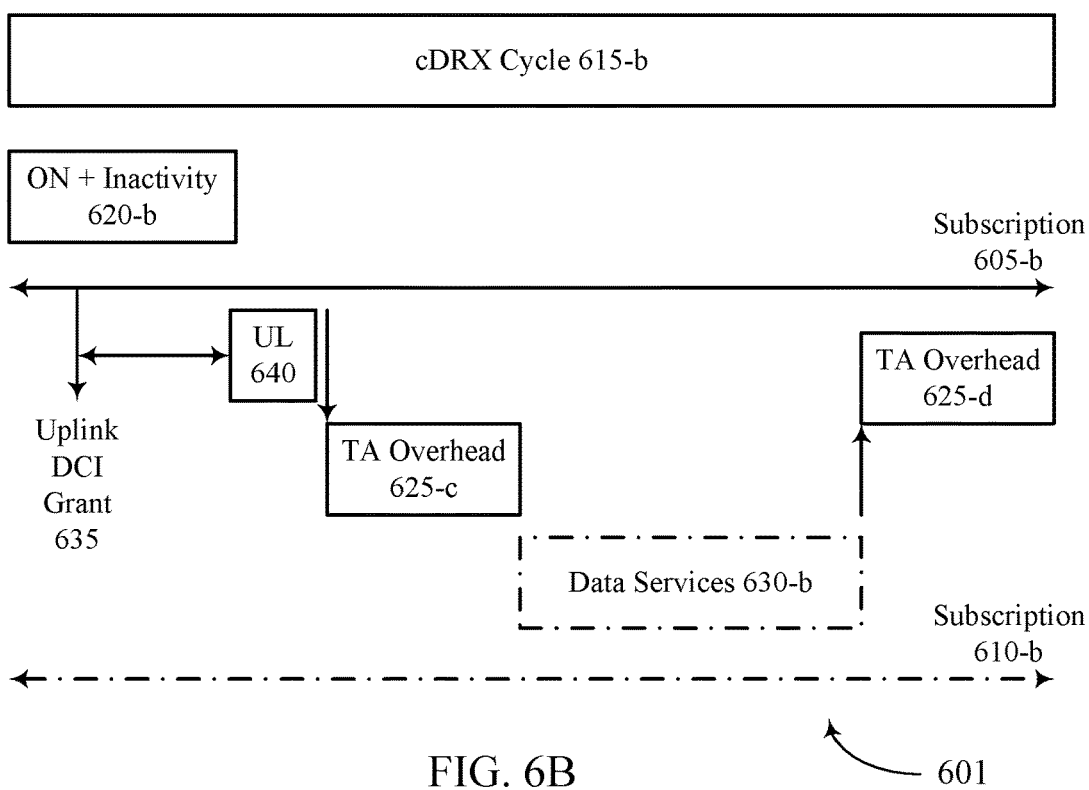

FIGS. 6A and 6B illustrate examples of TA mechanisms 600 and 601, respectively, for cDRX configurations that support data service and VoLTE in a multi-SIM system using a single transceiver in accordance with aspects of the present disclosure. In some examples, TA mechanisms 600 and 601 may implement aspects of wireless communications systems 100 and/or 200.

As described above, for improved power consumption and due to small data amounts transmitted as VoIP data packets during a VoLTE call, a UE 115 (e.g., at physical layer may be sleeping for a majority of the time (e.g., as shown in FIG. 4). Additionally, the ON time may be pre-defined to cDRX settings (e.g., configured in an RRC configuration message during setup of a VoLTE call).

As shown in TA mechanism 600, a cDRX cycle 615-a may be configured for the UE 115 for a VoLTE call that includes an ON duration and an inactivity time. In some cases, the cDRX cycle 615-a may include a 20 ms duration, 40 ms duration, or another time duration configured for the VoLTE call, and the ON duration and the inactivity time may be 2 ms, 4 ms, or another time duration. Additionally, within the cDRX cycle 615-a, an uplink transmission may occur with a same periodicity as a downlink reception. That is, an uplink downlink control information (DCI) grant for an uplink transmission may be sent once every 20 ms or 40 ms (e.g., depending on the downlink cDRX configuration being used). Additionally, several networks may deploy SPS, in which the UE 115 is pre-allocated (e.g., by a base station 105) with an SPS radio network temporary identifier (SPS-RNTI) (e.g., an allocation identifier) and a grant periodicity. Accordingly, the UE 115 may send and receive voice data only at those pre-allocation scheduled subframe according to the SPS, further reducing the UE 115 wakeup time to 2-3 subframes throughout the cDRX cycle 615.

In typical voice models, voice activity on downlink or uplink may happen for 50% of the time. Additionally, during periods of silence (e.g., as detected by a speech encoder), SID_UPDATE frames may be sent once every 160 ms to convey comfort noise parameters. Based on the limited downlink and uplink voice activity and the periods of silence, a UE 115 operating on a subscription 605-a (e.g., a subscription for an LTE network) may have an opportunity to "tune-away" (e.g., TA) to another frequency to maintain data service during the periods of silence. This TA may be a firmware-based tune away mechanism with reduced overhead for the UE 115.

This TA mechanism during sleep periods of a cDRX configuration (e.g., cDRX cycle 615-a) may not impact VoLTE call performance of quality metrics but may result in increased power consumption during such instances at the UE 115. However, the TA mechanism may give the ability to the UE 115 to continue to have data service over a second subscription 610-a (e.g., a subscription for a 5G/NR network). Accordingly, the UE 115 may use data applications and updates while continuing to be in a voice call via the VoLTE on subscription 605-a. Additionally, the TA mechanism may give the UE 115 the ability to receive a paging indication over subscription 610-a (e.g., 5G/NR) for an incoming call and allow a user operating the UE 115 to decide whether to accept the new incoming call while putting the existing VoLTE call on hold.

As shown in TA mechanism 600, the UE 115 may be in an SR-DSDS mode with a VoLTE call on subscription 605-a (e.g., LTE) and a connected mode on subscription 610-a (e.g., 5G). For a 40 ms cDRX cycle 615-a configuration, a TA mechanism may be enabled with a TA to access data services 630-a (e.g., for about 28 ms) on subscription 610-a as soon as an ON+inactivity 620-a timer expires in a LISTEN mode. In some cases, a TA overhead 625-a may take place between the ON+inactivity 620-a and the data services 630-a, where the TA overhead 625-a lasts a certain duration (e.g., about four (4) ms). The UE 115 may then tune back to subscription 605-a to be able to decode from beginning of an ON period for a next cDRX cycle, while taking into consideration a TA overhead 625-b (e.g., about 4 ms). In some cases, while LTE coverage is becoming ubiquitous (e.g., more common), areas may exist with either no VoLTE support or with no LTE coverage. As such, in case of a single radio voice call continuity (SRVCC) handover to a RAT below LTE (e.g., 3G, 2G RATs), the TA mechanism to switch to subscription 610-a (e.g., a 5G RAT) may be suspended, and no data for subscription 610-a may be available. However, SRVCC handover procedures may be rare in wireless networks (e.g., <5%). In some cases, if a network is using a 20 ms cDRX configuration (e.g., which may be rare but still used by some networks in some cases), the UE 115 may disable the TA mechanism, and data services for subscription 610-a (e.g., 5G service) may be suspended while a VoLTE call is enabled.

As shown in TA mechanism 601, a UE 115 may operating in a LISTEN mode or a TALK mode while in SR-DSDS. In the LISTEN mode, downlink data (e.g., a reception path) may be sustained on a subscription 605-b (e.g., a subscription for VoLTE) for an ON+inactivity 620-b duration (e.g., an ON duration and while an inactivity timer is running). Additionally or alternatively, in the LISTEN mode, uplink data may include SID UPDATES frames (e.g., 5 bytes), which may be transmitted once every 160 ms typically. In the TALK mode, downlink data may consist of receiving a SID_UPDATE frame with a periodicity of 160 ms. Additionally or alternatively, in TALK mode, uplink data 640 (e.g., one subframe) may be transmitted based on an uplink DCI grant 635 based on a cDRX configuration on the downlink. For example, for a 40 ms cDRX cycle 615-b configuration, the UE 115 may receive one uplink grant every 40 ms for VoIP packet transmission on uplink. After receiving the uplink DCI grant 635, the UE 115 may transmit the uplink data 640 once the ON+inactivity 620-b duration ends. Subsequently, after transmitting the uplink data 640, the UE 115 may use the TA mechanism to access data services 630-b (e.g., for about 25 ms) on a subscription 610-b (e.g., 5G services), while taking into consideration a TA overhead 625-c. The UE 115 may then tune back to subscription 605-b taking into consideration a TA overhead 625-d to prepare for an ON duration of a next cDRX cycle.

Figure 7:
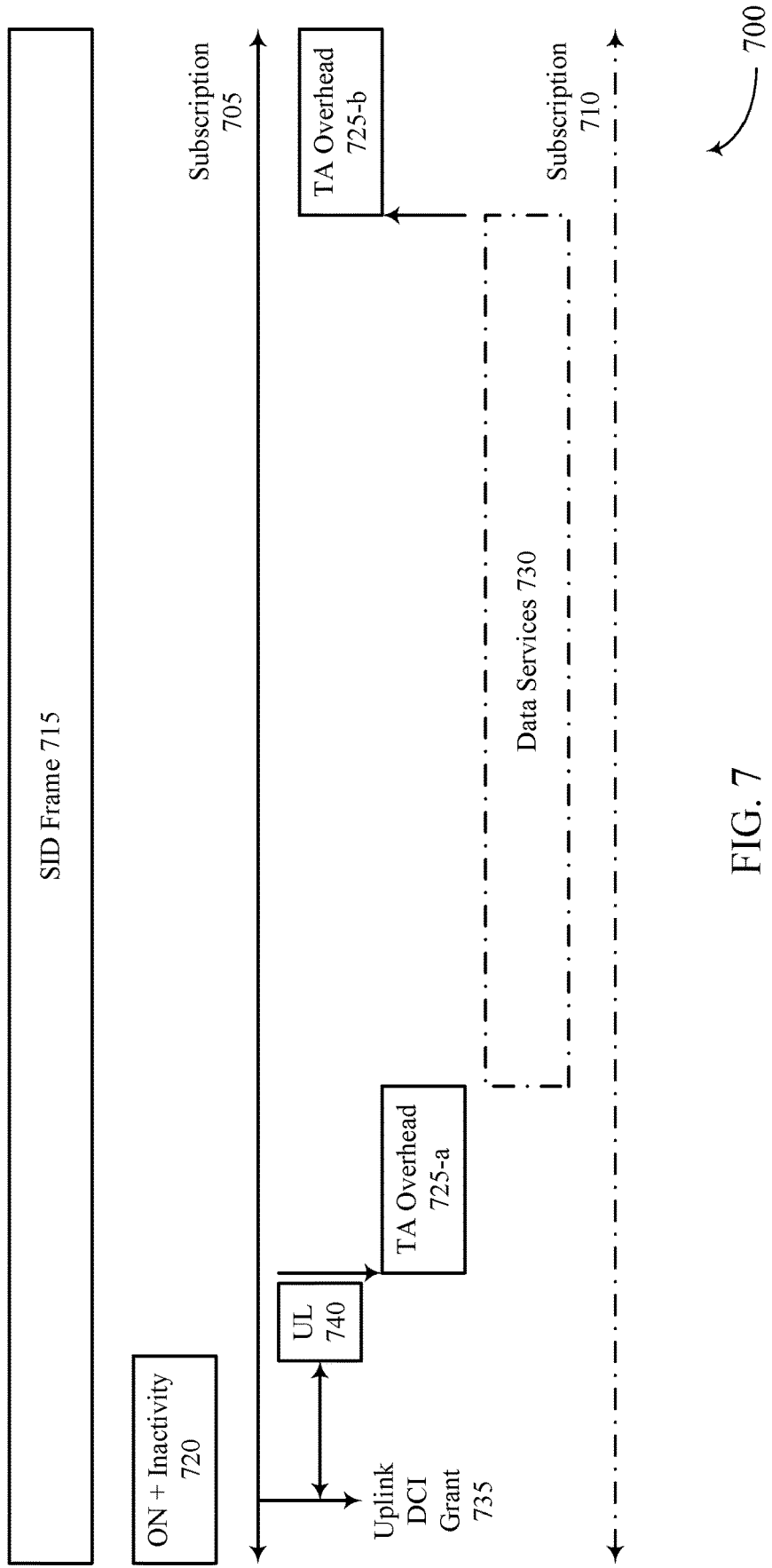
FIG. 7 illustrates an example of a TA mechanism for a silence insertion descriptor (SID) frame that supports data service and VoLTE in a multi-SIM system using a single transceiver in accordance with aspects of the present disclosure.

FIG. 7 illustrates an example of a TA mechanism 700 for a SID frame that supports data service and VoLTE in a multi-SIM system using a single transceiver in accordance with aspects of the present disclosure. In some examples, TA mechanism 700 may implement aspects of wireless communications systems 100 and/or 200. TA mechanism 700 may include similar elements of TA mechanism 601 as described above with reference to FIG. 6B. A UE 115 may use a subscription 705 (e.g., that uses 4G/LTE) for a VoLTE call that is performed during an SID frame 715. Additionally, the SID frame 715 may include an ON+inactivity 720 time. After the ON+inactivity 720 time expires, the UE 115 may use a TA mechanism (e.g., taking into consideration a TA overhead 725-a) to access data services 730 on a subscription 710 (e.g., that uses 5G/NR) before tuning back to subscription 705 (e.g., taking into consideration a TA overhead 725-b). In some cases, the TA mechanism may take place after the UE 115 receives an uplink DCI grant 735 and, subsequently, transmitting uplink data 740.

Some voice call modeling data may suggest that between 35-70% of a typical VoLTE call consists of SILENCE when voice activity detection (VAD) only requests SID transmission(s). As such, a significant duration may exist with SID_UPDATE frames for the TA mechanism to allow the UE 115 to access data services 730 (e.g., via subscription 710 for 5G data services). For example, data services 730 may last for about 145 ms, compared to 25-28 ms for the data services 630-a and 630-b, respectively, as described above with reference to FIGS. 6A and 6B. Based on the VAD in the VoLTE calls, in most voice calls, the call may be often in SILENCE mode with comfort noise being sent on downlink as well uplink.

Some data applications on a data subscription (e.g., e-mail, web browsing, chat applications, streaming videos, etc.) typically involve bursts of data with significant idle time in between. Additionally, in many cases, rather small amounts of data may be transmitted within a few milliseconds over a subscription for the data applications (e.g., a 5G radio channel). Accordingly, being able to use the TA mechanism to access the data subscription for approximately 50-70% of an SID frame 715, the amount of time the UE 115 may be able to use the TA mechanism may depend on network parameters such as cDRX configurations, SILENCE characteristics of the call, etc. Accordingly, the time while in the VoLTE call may allow the UE 115 to support the data applications, being able to access the data applications while being on a VoLTE call (e.g., on subscription 705). However, this mode may not be conducive for applications or services that need very high data rates with stringent QoS parameters for latency and a guaranteed bit rate (GBR). Such applications may be disabled during the time of the ongoing VoLTE (e.g., voice) call while letting a user of the UE 115 to know if such applications are attempted, the application may not be supported during the VoLTE call on subscription 705. For example, these applications may include gaming applications and/or augmented reality (AR)/virtual reality (VR)-based applications.

Figure 8A:
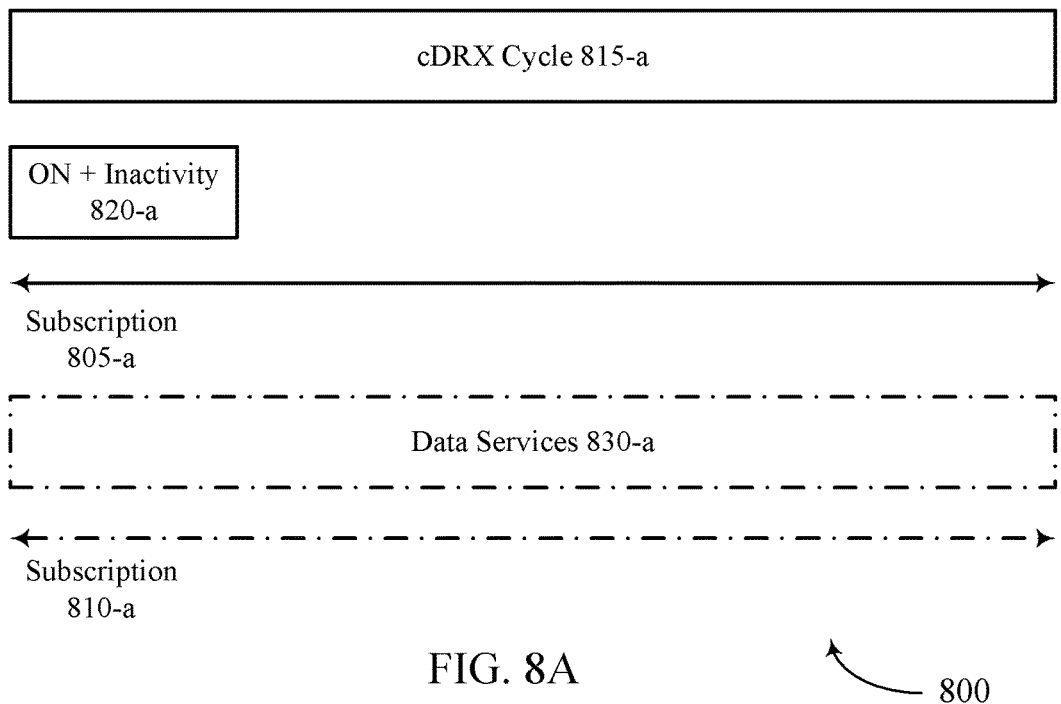
FIGS. 8A and 8B illustrate examples of dual receive dual service dual standby (DR-DSDS) modes for cDRX configurations that support data service and VoLTE in a multi-SIM system using a single transceiver in accordance with aspects of the present disclosure.
Figure 8B:
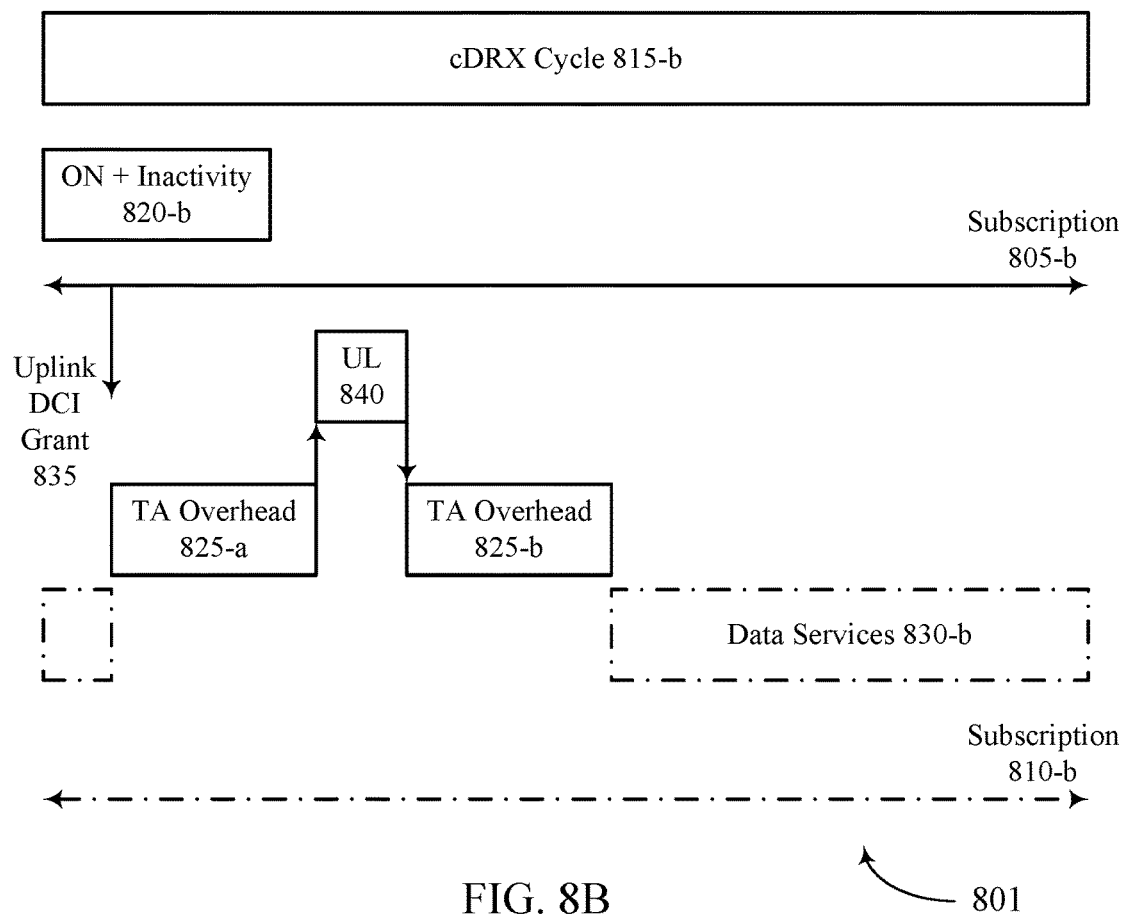

FIGS. 8A and 8B illustrate examples of DR-DSDS modes 800 and 801, respectively, for cDRX configurations that support data service and VoLTE in a multi-SIM system using a single transceiver in accordance with aspects of the present disclosure. In some examples, DR-DSDS modes 800 and 801 may implement aspects of wireless communications systems 100 and/or 200.

In a dual receive mode, while using a single transceiver, a UE 115 may simultaneously receive data using two (2) reception paths for up to two different RATs. While in this mode, the UE 115 may allocate some of the receive path resources for a second RAT by temporarily diverting some of the unused or non-essential receive paths. However, the UE 115 may use the one transceiver for one transmit path on the uplink. DR-DSDS modes may include a trade-off between a single receive single transceiver solution and dual service dual access (DSDA) solutions, where the DSDA solutions may support dual access and simultaneous transmissions. While sharing dual RF resources between two different RATs may involve some complexity, the sharing does not involve two transmits and, hence, may be more viable both in terms of cost and mobile power consumption than a DSDA solution.

As shown in DR-DSDS mode 800, in a LISTEN only mode of a VoLTE call during a cDRX cycle 815-a, since downlink reception can happen simultaneously on a subscription 805-a (e.g., 4G/LTE) and a subscription 810-a (e.g., 5G/NR) (e.g., two RATs) in a dual receive mode, no interruption to data services on either subscription may occur. Accordingly, a UE 115 may access data services 830-a of a subscription 810-a for the entire cDRX cycle 815-a. For example, for a 40 ms duration cDRX cycle 815-a, the UE 115 may access data services 830-a for the entire 40 ms.

Additionally or alternatively, as shown in DR-DSDS modes 801, an interruption in a UE 115 accessing data services 830-b of a subscription 810-b may occur during an uplink data 840 transmission. In some cases, the uplink data 840 may include a transmission for SID_UPDATE frames (e.g., with a periodicity of 160 ms) from the UE 115. For example, the UE 115 may receive an uplink DCI grant 835 on a subscription 805-b (e.g., 4G/LTE), suspending access to data services 830-b, where the UE 115 uses a TA mechanism to tune back to subscription 805-b (e.g., taking into consideration a TA overhead 825-a) for transmitting the uplink data 840 indicated by uplink DCI grant 835. The UE 115 may then use the TA mechanism to tune away from subscription 805-a again and access data services 830-b using subscription 810-b (e.g., taking into consideration a TA overhead 825-b). The actual TA time needed on subscription 805-b (e.g., VoLTE subscription) may include one (1) sub-frame on which the UE 115 transmits the SID_UPDATE frame since the uplink DCI grant 835 transmission can also be received in the dual receive mode. Accordingly, the interruption on data services 830-b on subscription 810-b (e.g., 5G subscription) may be short (e.g., <10 ms during a 160 ms period, accounting for TA overhead 825-a and 825-b needed). For example, the UE 115 may access data services 830-b for about 30 ms out of a 40 ms long cDRX cycle 815-b.

In some cases, unlike in the single receive mode as described above with reference to FIGS. 6A, 6B, and 7, data services may be sustained even if a network does use a 20 ms cDRX cycle 815 configuration since, in the dual receive mode, the UE 115 may not have to use the TA mechanism for downlink data received during ON periods (e.g., ON+inactivity 820-a or 820-b durations).

Figure 9:
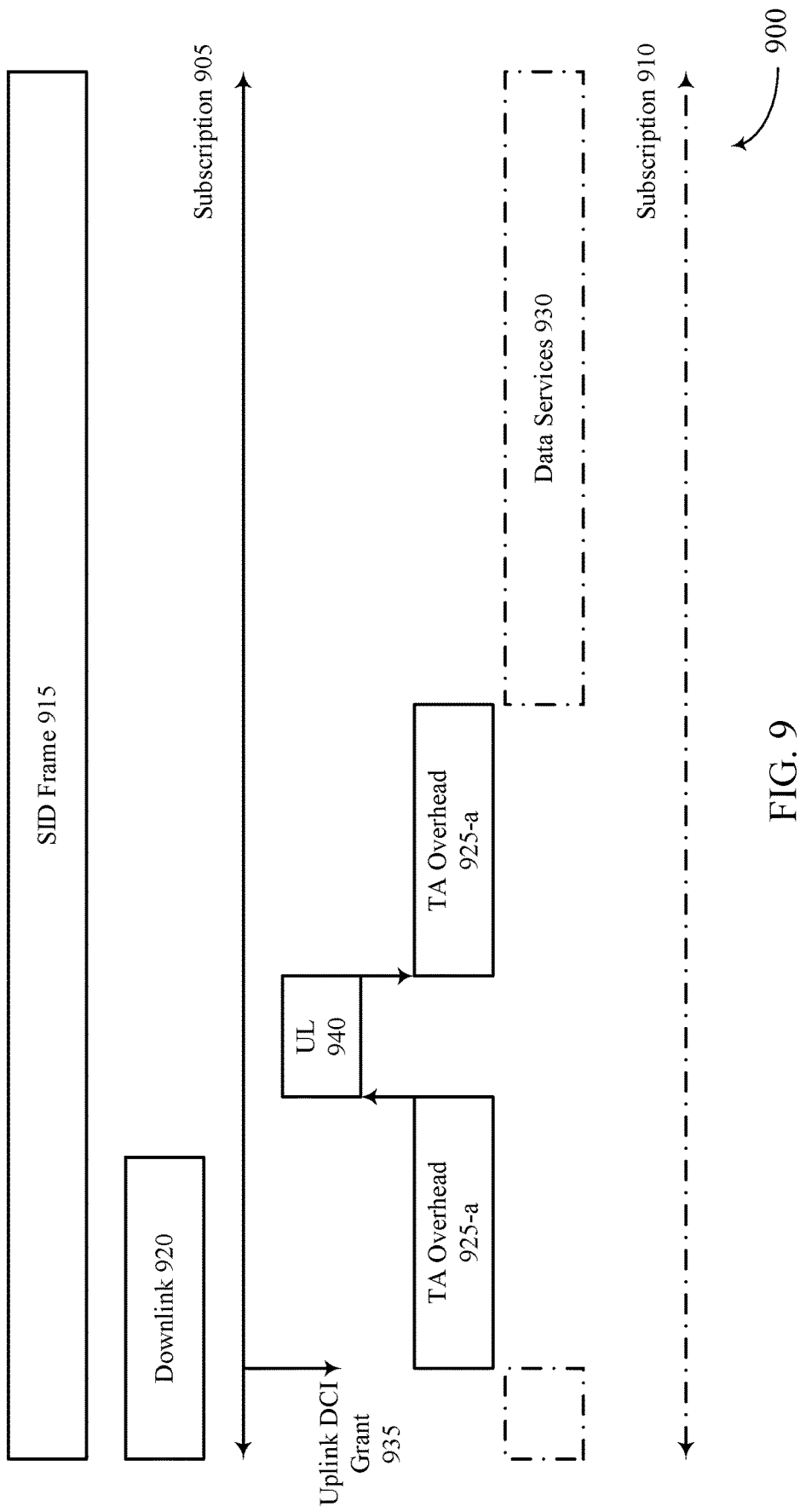
FIG. 9 illustrates an example of a DR-DSDS mode for a SID frame that supports data service and VoLTE in a multi-SIM system using a single transceiver in accordance with aspects of the present disclosure.

FIG. 9 illustrates an example of a DR-DSDS mode 900 for a SID frame that supports data service and VoLTE in a multi-SIM system using a single transceiver in accordance with aspects of the present disclosure. In some examples, DR-DSDS mode 900 may implement aspects of wireless communications systems 100 and/or 200. DR-DSDS mode 900 may include similar elements as DR-DSDS mode 801 as described above with reference to FIG. 8B, but DR-DSDS mode 900 may be employed in a SID frame 915 (e.g., a 160 ms duration). For example, a UE 115 may perform a VoLTE call on a subscription 905 (e.g., 4G/LTE) while accessing data services 930 on a subscription 910 (e.g., 5G/NR). In some cases, the UE 115 may use a TA mechanism while receiving downlink communications (e.g., downlink 920) on both subscriptions if an uplink DCI grant 835 while the UE 115 is in an ON+inactive duration of a cDRX cycle for subscription 905. Accordingly, the UE 115 may use the TA mechanism to tune back to subscription 905 to transmit uplink data 940 (e.g., a SID_UPDATE frame) before going back to accessing data services 930 of subscription 910 (e.g., taking into consideration TA overheads 925-a and 925-b).

In DR-DSDS mode 900, while in a TALK mode, an interruption may occur for data services 930 (e.g. 5G data). However, the duration of the interruption may not be dependent on cDRX configuration parameters being used by the network (e.g., ON time, inactivity timer in a short cDRX cycle, etc.). Accordingly, data services 930 in TALK mode may be more reliable, where the interruption may be due to uplink data 940 (e.g., a VOIP packet of 244 bits), which needs to be transmitted over one (1) subframe. Similarly, for periods of SILENCE with only SID_UPDATE frames (e.g., uplink data 940) being transmitted in both downlink and uplink, data services 930 may be available for an extended period (e.g., about 150 ms during a 160 ms periodicity for SID frame 915). This amount of availability may represent a slight improvement from the SR-DSDS mode as described above with reference to FIG. 7 (e.g., about 145 ms for the TA mechanism 700 as described in FIG. 7) since interruption to data services 930 may happen for uplink transmission of a SID_UPDATE frame (e.g., uplink data 940), which has five (5) bytes of data.

Figure 10A:
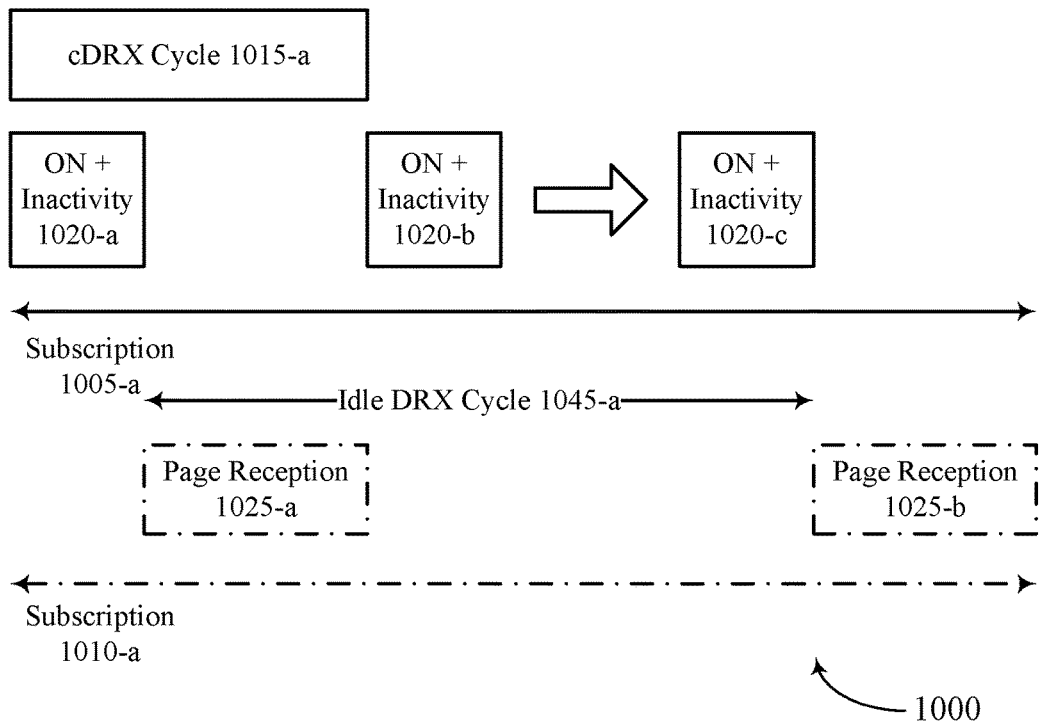
FIGS. 10A and 10B illustrate examples of paging monitoring for cDRX configurations that support data service and VoLTE in a multi-SIM system using a single transceiver in accordance with aspects of the present disclosure.
Figure 10B:
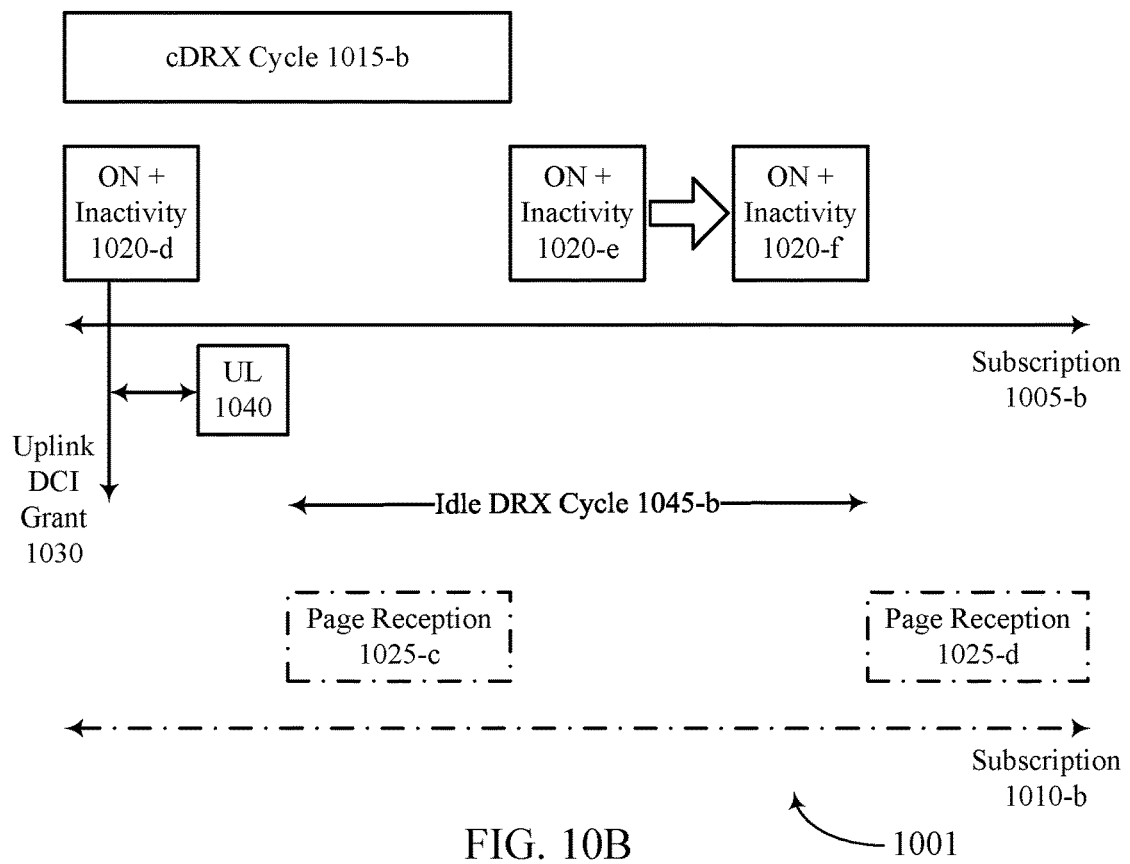

FIGS. 10A and 10B illustrate examples of paging monitoring configurations 1000 and 1001, respectively, for cDRX configurations that support data service and VoLTE in a multi-SIM system using a single transceiver in accordance with aspects of the present disclosure. In some examples, paging monitoring configurations 1000 and 1001 may implement aspects of wireless communications systems 100 and/or 200. A UE 115 may perform a VoLTE call on a subscription 1005 (e.g., 4G/LTE), while being in an idle mode on a subscription 1010 (e.g., 5G/NR). Accordingly, the UE 115 may monitor paging occasions on subscription 1010 for any possible mobile terminal (MT) page reception. The UE 115 may monitor the paging occasions on subscription 1010 based on a network configured idle DRX cycle 1045, which could range from 320 ms to 2.56 seconds. In most deployment scenarios, idle DRX cycle 1045 may be 640 ms. As such, while a VoLTE call is active on subscription 1005, idle mode paging on subscription 1010 may be monitored every 640 ms. In paging monitoring configurations 1000 and 1001, the UE 115 may use DR-DSDS modes with various VoLTE call modes where the pages on subscription 1010 do not overlap (e.g., do not collide) with VoLTE call related reception/transmission activities on subscription 1005.

As shown in paging monitoring configuration 1000, during idle paging on a subscription 1010-a and a Listen only mode for the VoLTE on a subscription 1005-a, a cDRX cycle 1015-a (e.g., a 40 ms CDRX cycle) and an ON+inactivity 1020-a duration for the VoLTE call and an idle DRX cycle 1045-a (e.g., a 640 ms CDRX cycle) and ON duration for the paging occasions may occur at different times. Accordingly, the ON durations for both subscriptions may not interfere to each other as both of their wakeup cycles are independently using RF resources for receiving only data. Also, both subscriptions wakeup cycles may be integer multiples of each other, and hence, the wakeup cycles may not change respective wakeup durations while on the same cell with a same timing offset. For example, 16 cDRX wakeups (e.g., from ON+inactivity 1020-b to ON+inactivity 1020-c durations) for subscription 1005-a may occur in between the UE 115 monitoring for two page receptions 1025 (e.g., page receptions 1025-a and 1025-b), and the wakeup durations for subscription 1005-a and for 1045-a may stay the same, which results in no overlaps or collisions. Accordingly, the VoLTE call (e.g., Listen only mode) and page decodes (e.g., for 5G pages) may proceed without any conflicts. Additionally, no impact may be expected if the UE 115 is in a SR-DSDS mode. In some cases, the page receptions 1025 may last five 10 ms.

As shown in paging monitoring configuration 1001, even during talk only or SID update modes, if a paging occasion does not collide with a VoLTE call uplink transmission cycle, both paging data and VoLTE call reception/transmission data may be handled independently without any interruption by waking up at different times on a subscription 1005-b (e.g., for the VoLTE call on 4G/LTE) and a subscription 1010-b (e.g., for the paging monitoring on 5G/NR). For example, subscription 1005-b may include a cDRX cycle 1015-b (e.g., a 40 ms CDRX cycle) with ON+inactivity 1020 durations (e.g., cDRX wakeups), and subscription 1010-b may include an idle DRX cycle 1045-b (e.g., a 640 ms CDRX cycle) where the UE 115 wakes up to monitor for a page reception 1025. In some cases, the UE 115 may receive an uplink DCI grant 1030 in an ON+inactivity 1020-d duration and, accordingly, transmit uplink data 1040.

However, the uplink data 1040 transmission may not overlap with the UE 115 monitoring for a page reception 1025-c. Additionally, similar to paging monitoring configuration 1000, additional cDRX wakeups (e.g., from ON+inactivity 1020-e to ON+inactivity 1020-f durations) for subscription 1005-b may not collide with any page receptions 1025 for subscription 1010-b, and 16 cDRX wakeups may occur for subscription 1005-b may occur between any two page receptions 1025 (e.g., page receptions 1025-c and 1025-d) based on the configured durations for cDRX cycle 1015 and idel DRX cycle 1045 (e.g., 40 ms and 640 ms, respectively).

If the UE 115 is in single receive or DR-DSDS modes, the UE 115 may successfully perform individual activities for each subscription without any TA mechanism. Additionally, while cDRX cycles 1015 on subscription 1005 are described above with a 40 ms duration, the techniques may be extended to a SID frame of 160 ms. For example, from the perspective of the UE 115, a SID_UPDATE transmission (e.g., uplink data 1040 transmission) may be performed every 160 ms, while page receptions 1025 may be decoded every 640 ms (e.g., based on the 640 ms idle DRX cycle 1045-b duration). Accordingly, the UE 115 may transmit four (4) SID UPDATES between one idle DRX cycle 1045 for subscription 1010 (e.g., for 5G paging).

Figure 11:
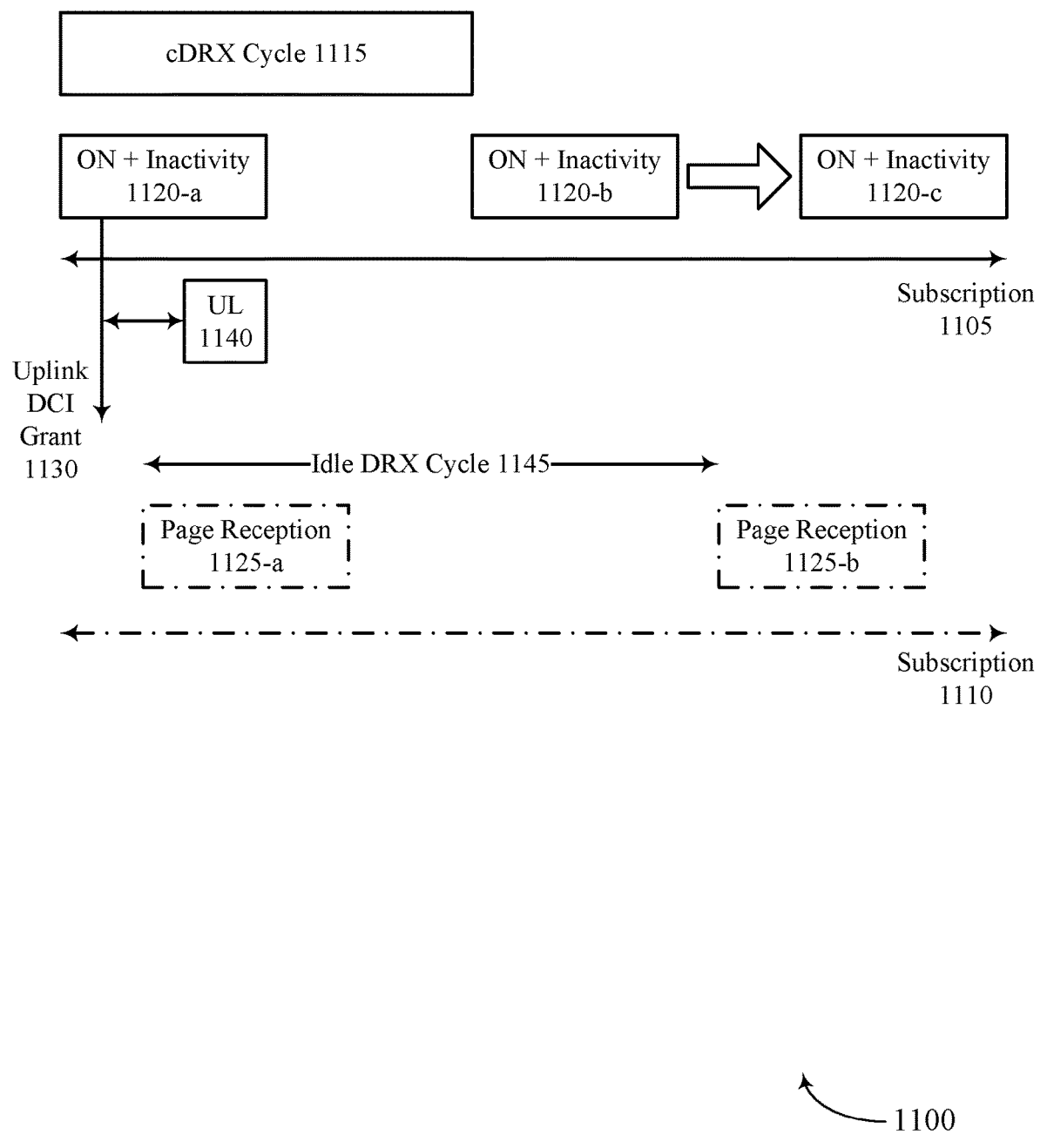
FIG. 11 illustrates an example of a paging monitoring configuration that supports data service and VoLTE in a multi-SIM system using a single transceiver in accordance with aspects of the present disclosure.

FIG. 11 illustrates an example of a paging monitoring configuration 1100 that supports data service and VoLTE in a multi-SIM system using a single transceiver in accordance with aspects of the present disclosure. In some examples, paging monitoring configuration 1100 may implement aspects of wireless communications systems 100 and/or 200. Paging monitoring configuration 1100 may include similar elements to paging monitoring configuration 1001 as described above with reference to FIG. 10B. For example, a UE 115 may perform a VoLTE call on a subscription 1105 and be in an idle mode on a subscription 1110, where the UE 115 monitors for paging occasions on subscription 1110. However, ON+inactivity 1120 durations (e.g., wakeup durations) for a cDRX cycle 1115 configured for subscription 1105 may collide (e.g., overlap in time) with wakeup durations of an idle DRX cycle 1145, where the UE 115 monitors for a page reception 1125. Additionally, the UE 115 may receive an uplink DCI grant 1130 for transmitting uplink data 1140 (e.g., a SID_UPDATE transmission) that may also collide with a page reception 1125.

If cDRX cycle 1115 includes a 40 ms duration cycle and idle DRX cycle 1145 includes a 640 ms duration cycle, every 16$^{th}$ paging occasion (e.g., a page reception 1125) may collide with a VoLTE call ON duration (e.g., an ON+inactivity 1120 duration). Accordingly, if both wakeup times for subscriptions 1105 and 1110 align in such a way that both wake occasions collide (e.g., ON+inactivity 1120 durations and page receptions 1125), one of the subscriptions may lose the scheduled activity to allow the activity for the other subscription. In some cases, a collision may be partial (e.g., a head/beginning of one of the wakeups collides with a tail/end of the other wakeup) or may be a complete overlap based on relative timings of the activities for each subscription. Additionally, behavior may be different if the UE 115 is in an SR-DSDS mode or a DR-DSDS mode.

Figure 12:
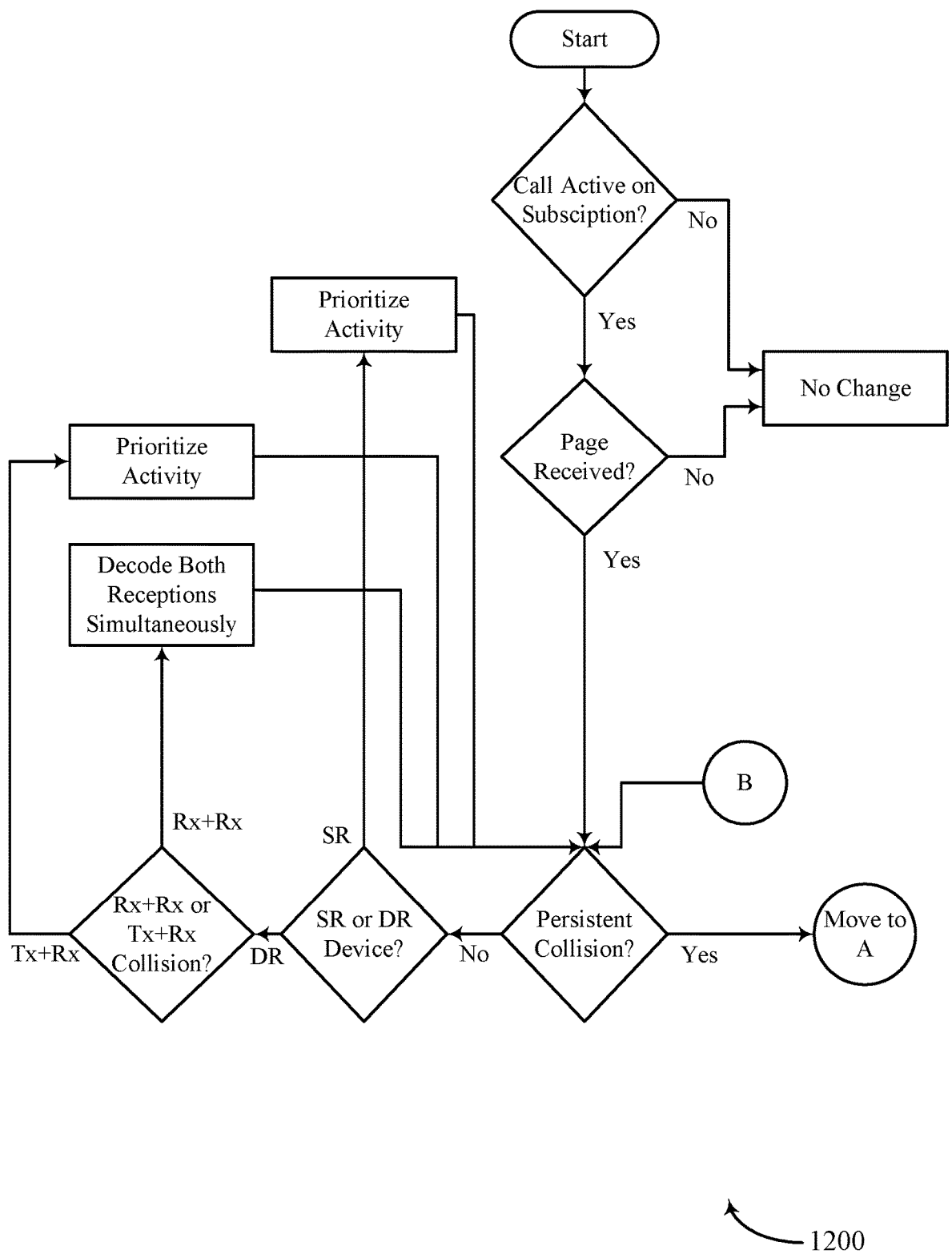
FIGS. 12 and 13 illustrate examples of flowcharts that support data service and VoLTE in a multi-SIM system using a single transceiver in accordance with aspects of the present disclosure.

FIG. 12 illustrates an example of a flowchart 1200 that supports data service and VoLTE in a multi-SIM system using a single transceiver in accordance with aspects of the present disclosure. In some examples, flowchart 1200 may implement aspects of wireless communications systems 100 and/or 200. Flowchart 1200 may illustrate techniques for a UE 115 to handle collision scenarios of ON durations (e.g., ON times) for a VOLTE call (e.g., on a first subscription supporting 4G/LTE) with paging occasions on a DDS subscription (e.g., 5G/NR subscription).

In some cases, the UE 115 may include a DR-DSDS mode, where a cDRX ON duration and/or an uplink transmission of a VoLTE call on a first subscription occurs at a same time (e.g., collides) as a paging message received on a second subscription. Accordingly, in the dual receive mode, receiving and receiving activities on the two subscriptions may occur in parallel. However, transmission on one subscription and reception on the other subscription may not be performed together. For example, while the VoLTE call is in a "Listen only" mode without any uplink activity, a downlink SID frame and any speech frames may be received on the first subscription as part of the VoLTE call along with any page reception and/or data reception on the second subscription. Alternatively, while the VoLTE call is in a "Talk only" mode or a "SID update transmission" mode, an uplink frame for the VoLTE call may be prioritized over a page reception on the second subscription, and the page reception may be aborted. In some cases, if the network transmits repetitive paging messages for an MT calls, denied (e.g., and/or aborted) pages for the second subscription may be received in a subsequent attempt.

Additionally or alternatively, the UE 115 may includes SR-DSDS mode with a collision between communications on the two subscriptions (e.g., a cDRX ON duration and/or an uplink transmission of a VoLTE call on a first subscription occurs at a same time as a paging message received on a second subscription). While the UE 115 is in the SR-DSDS mode, only one reception/transmission activity may proceed for either of the subscriptions. For example, for all VoLTE call modes (e.g., "Listen only" mode, "Talk only" mode, SID update transmission" mode, etc.), either VoLTE cDRX transmission/reception activities on the first subscription or a page on the second subscription may be prioritized. In some cases, the UE 115 may initially prioritize a VoLTE call activity over a page based on the page may be decoded in subsequent attempts because the network may page the UE 115 more than once for any MT calls.

As illustrated by flowchart 1200, the UE 115 may begin communications on the first and/or second subscription. Initially, the UE 115 may determine whether a VoLTE call is active on the first subscription (e.g., 4G/LTE). If not, the UE 115 may not make any changes and may transmit and/or receive data on the second subscription (e.g., 5G/NR). Alternatively, if the VoLTE call is active, the UE 115 may determine if a paging message (e.g., page) is received on the second subscriber at the same time as an uplink or downlink transmission for the VoLTE call. If not, the UE 115 may not make any changes and continue communications on both subscriptions. Alternatively, if a collision does exist, the UE 115 may determine if the collision is part of a persistent collision (e.g., an MT call that the network keeps paging the UE 115 for). If the collision is persistent, the UE 115 may proceed to mitigation techniques (e.g., as shown by 'A' in flowchart 1200), which may be described further below with reference to FIG. 13. Alternatively, if the collision is not persistent, the UE may determine with the UE is operating in a single receive (e.g., 'SR' as shown in FIG. 12) or a dual receive (e.g., 'DR' as shown in FIG. 12) mode.

If the UE 115 is operating in a single receive mode, the UE 115 may prioritize all VoLTE call modes over pages on the second subscription, and then the UE 115 may return to determining whether the collision is persistent (e.g., if the collision occurs a subsequent time). Alternatively, if the UE is operating in a dual receive mode, the UE 115 may determine the type of collision occurring. If the type of collision is a reception and reception collision (e.g., the UE 115 receives two transmissions at a same time, each from one of the subscriptions), and the UE 115 may decode a received transmission for the VoLTE call (e.g., on the first subscription) and a page on the second subscription simultaneously and then return to determining whether the collision is persistent. Alternatively, if the type of collision includes a transmission colliding with a reception, the UE 115 may prioritize the VoLTE activity (e.g., VoLTE transmission activity) and then return to determining whether the collision is persistent. Additionally, mitigation techniques for the persistent collision may be described in detail below with reference to FIG. 13, where 'B' as shown in FIG. 12 may correspond to a 'B' element in FIG. 13.

Figure 13:
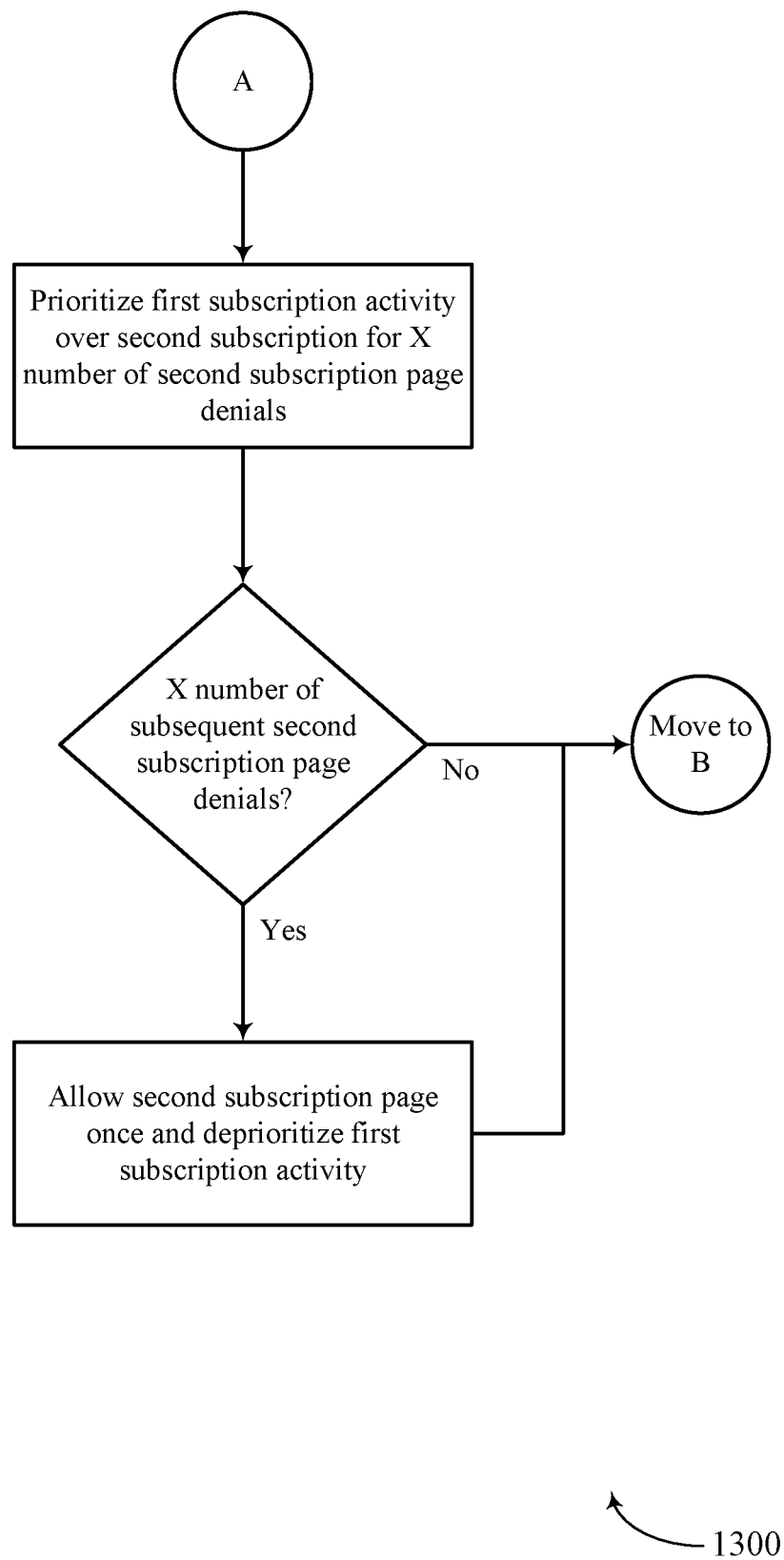

FIG. 13 illustrates an example of a flowchart 1300 that supports data service and VoLTE in a multi-SIM system using a single transceiver in accordance with aspects of the present disclosure. In some examples, flowchart 1300 may implement aspects of wireless communications systems 100 and/or 200. Flowchart 1300 may illustrate a continuation of flowchart 1200 as described above with reference to FIG. 12. Accordingly, flowchart 1300 may provide techniques for a UE 115 to handling collision scenarios of an ON time on a VOLTE call (e.g., a first subscription, 4G/LTE, etc.) with one or more paging occasions on a DDS subscription (e.g., a second subscription, 5G/NR subscription, etc.). For example, flowchart may describe mitigation efforts for back-to-back page denials.

Since VoLTE call activity may be prioritized over pages on the second subscription, in a persistent collision case, a way to allow decodes of the pages on the second subscription in between VoLTE cDRX ON durations may be desired. Accordingly, the UE 115 may keep a counter of consecutive page denials and increase the priority of the pages for the second priority after X number of subsequent page denials (e.g., X=3). This tracking of consecutive page denials may allow a trade of between the VoLTE call on the first subscription and page receptions on the second subscription.

As shown, the UE 115 may enter these mitigation techniques based on the steps provided in FIG. 12 as described above (e.g., 'Move to A' as seen in FIG. 12 corresponds to the 'A' as shown in FIG. 13). Accordingly, if the UE 115 determines that a persistent collision is occurring between communications of the first subscription and communications of the second subscription, the UE 115 may prioritize first subscription activity (e.g., VoLTE transmission/reception activity) over pages on the second subscription for X (e.g., X=3) number of second subscription page denials (e.g., a threshold number of 5G page denials). In some cases, X may be a configurable value (e.g., by the network, a base station 105, programmed within the UE 115, etc.).

The UE 115 may then determine if an X number of subsequent second subscription page denials have occurred. If the X number of page denials have not occurred, the UE 115 may return to determining if the collision is persistent as described above with reference to FIG. 12 (e.g., "Move to B' as shown in FIG. 13 may correspond to 'B' as shown in FIG. 12). Alternatively, if the X number of page denials have occurred, the UE 115 may allow a second subscription page (e.g., 5G page) once and deprioritize first subscription activity (e.g., VoLTE call transmission/reception activity). After allowing the second subscription page, the UE 115 may return to determining if a collision occurs, and if so, whether the collision is persistent as described above with reference to FIG. 12.

In the mitigation efforts suggested where the transmission of a VoLTE call collides with a page reception of the DDS subscription (e.g., 5G), the VoLTE call may use a 40 ms cDRX cycle while an idle DRX cycle for the second subscription (e.g., 5G/NR) may include a 640 ms cycle. Accordingly, the collision may occur once in every 16 cycles of the VoLTE call transmissions. Additionally, since page reception may be give higher priority after three (3) collisions (e.g., X=3), an uplink transmission (e.g., as indicated by the page reception) may be missed for every ⅟₄₈th frame. Missing the uplink transmission for every 1/48 frame may not result in any voice quality degradation and may be recovered through error correction coding on a receiver side.

Similarly, for a SILENCE mode on the uplink, one in four SID_UPDATE frame transmissions may collide with a page reception. If X=3, ⅟₁₂th of the SID_UPDATE frames may be impacted for the collision scenarios in a dual receive mode for the UE 115. In terms of overall voice quality for a corner case where a SID_UPDATE transmission collides with an idle mode page decode on the DDS subscription (e.g., second subscription, 5G/NR, etc.), skipping ⅟₁₂th of the SID_UPDATE frames may be an acceptable trade off which will not impact comfort noise generation (e.g., as indicated by the SID_UPDATE frames) on the receiver end based on receiver decoders repeating same comfort noise parameters for missed SID_UPDATE frames.

Figure 14:
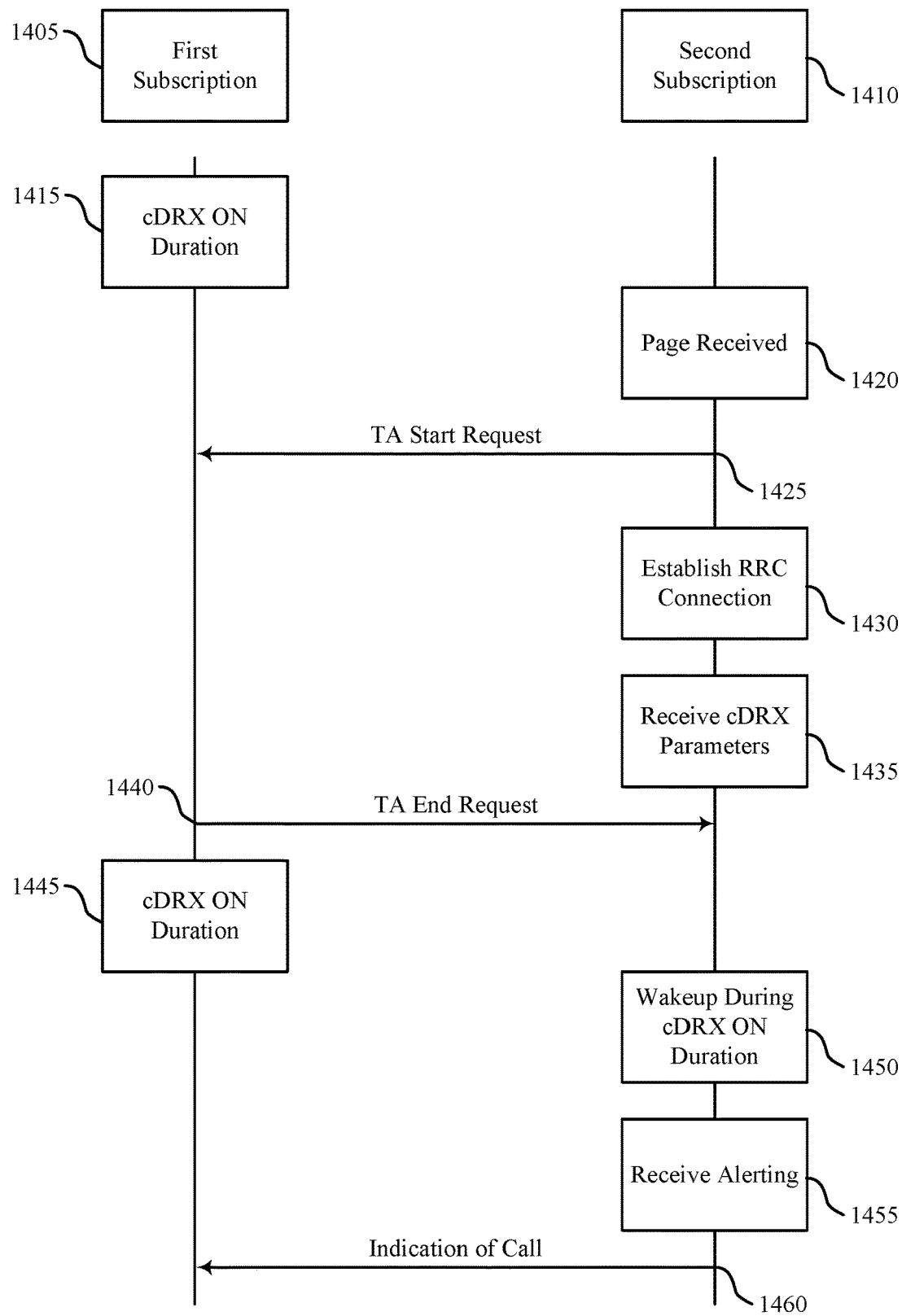
FIGS. 14 and 15 illustrate examples of process flows that support data service and VoLTE in a multi-SIM system using a single transceiver in accordance with aspects of the present disclosure.

FIG. 14 illustrates an example of a process flow 1400 that supports data service and VoLTE in a multi-SIM system using a single transceiver in accordance with aspects of the present disclosure. In some examples, process flow 1400 may implement aspects of wireless communications systems 100 and/or 200. Process flow 1400 may illustrate a procedure for a UE 115 to receive a calling part phone number while a VoLTE call is active on an additional subscription. In some cases, the UE 115 may communicate according to a first subscription 1405 and according to a second subscription 1410. For example, the communications on the first subscription 1405 may include a VoLTE call active on the first subscription 1405 (e.g., 4G/LTE), and the communications on the second subscription 1410 may include a received MT page and call on the second subscription 1410 (e.g., 5G/NR).

At 1415, the UE 115 may include an LTE VOLTE call (e.g., based on an ON duration of the cDRX cycle configured for the VoLTE call) while page reception is ongoing for the second subscription 1410.

At 1420, the UE 115 may receive an MT paging message indicating an MT call or a short message service (SMS) reception on the second subscription 1410. In some cases, the paging message on the second subscription 1410 may indicate for the UE 115 to establish an RRC connection to get the information about the page.

At 1425, the UE 115 may use a TA mechanism (as described above) to request a TA start to tune away from the first subscription 1405 and monitor the second subscription 1410 based on the received page.

At 1430, the UE 115 may perform the RRC connection establishment and get the calling party number for an indication on the uplink about the second voice call as indicated by the paging message (e.g., or an SMS reception). In some cases, during the establishment of RRC connection on the second subscription 1410, the UE 115 may tune away from the VoLTE call for about 500 ms (e.g., based on the TA mechanism). Accordingly, the TA may continue until the RRC connection is established and a cDRX configuration for the second subscription 1410 is received.

At 1435, the UE 115 may receive the cDRX parameters and configuration for the second subscription based on the RRC connection being established. As soon as RRC Reconfiguration message received on the second subscription 1410, a cDRX mode may be activated to reduce the TA time on the VoLTE call on the first subscription 1405.

At 1440, the UE 115 may end the TA mechanism, where the UE 115 tunes back to the first subscription 1405. Accordingly, at 1445, the UE 115 may monitor an ON duration of the cDRX cycle for the first subscription 1405.

At 1450, the UE 115 may wakeup during an ON duration of a cDRX configuration for the second subscription 1410 based on the parameters received at 1435 (e.g., based on the cDRX configuration for the VoLTE call on the first subscription. Additionally, the UE 115 may wait until an alerting message is received.

At 1455, the UE 115 may receive the alerting on the second subscription 1410, and a calling party identity may be received. At 1460, an indication of the calling party identity may be transmitted to the user of the UE 115 on the VoLTE call on the first subscription, and the user may be given an option to switch the voice call from the first subscription 1405 to the second subscription 1410.

Figure 15:
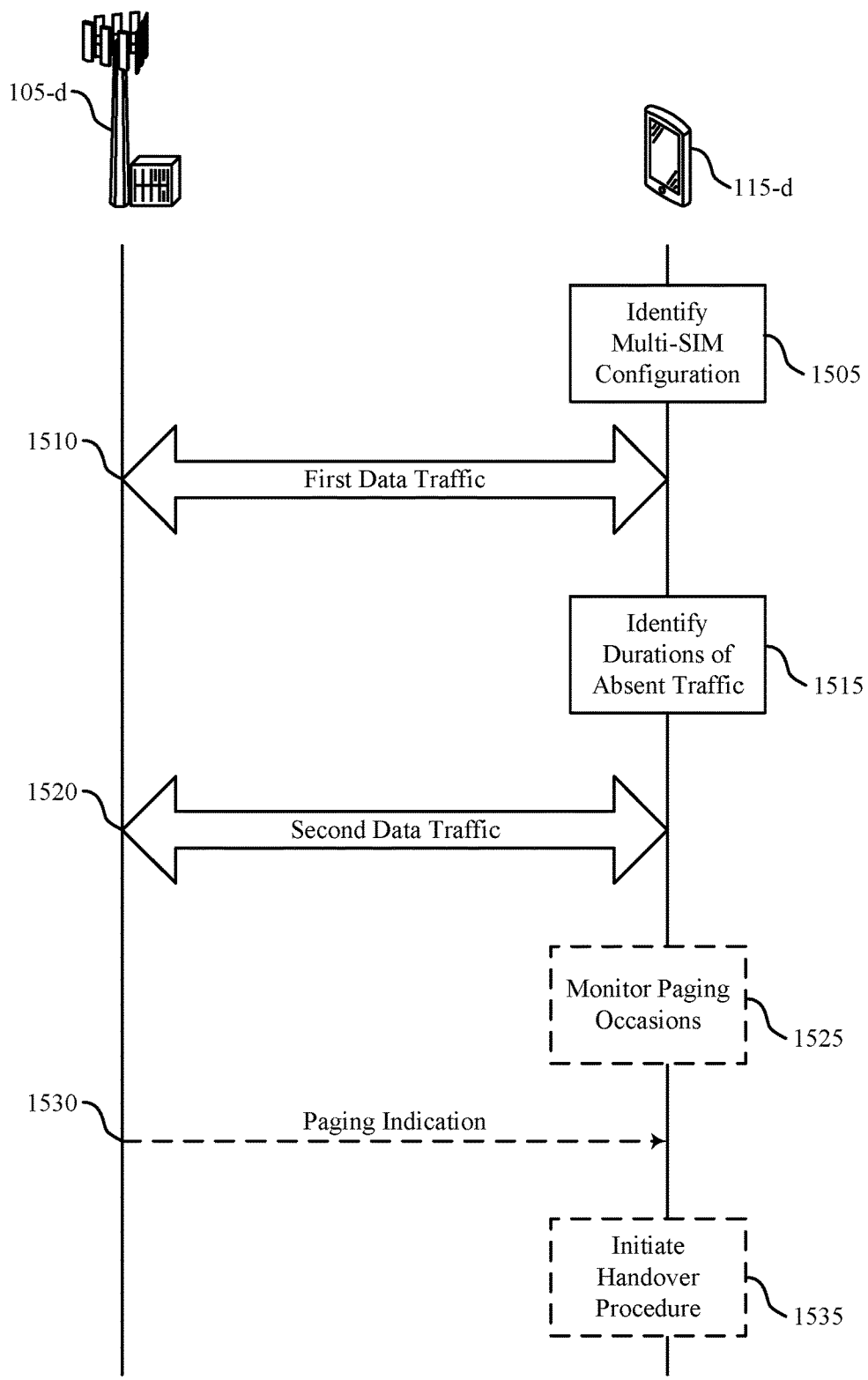

FIG. 15 illustrates an example of a process flow 1500 that supports data service and VoLTE in a multi-SIM system using a single transceiver in accordance with aspects of the present disclosure. In some examples, process flow 1500 may implement aspects of wireless communications systems 100 and/or 200. Process flow 1500 may include a UE 115-*d* and a base station 105-*d*, which may be examples of corresponding UEs 115 and base stations 105, respectively, as described herein.

In the following description of the process flow 1500, the operations between UE 115-*d* and base station 105-*d* may be transmitted in a different order than the order shown, or the operations performed by base station 105-*d* and UE 115-*d* may be performed in different orders or at different times. Certain operations may also be left out of the process flow 1500, or other operations may be added to the process flow 1500. It is to be understood that while base station 105-*d* and UE 115-*d* are shown performing a number of the operations of process flow 1500, any wireless device may perform the operations shown.

At 1505, UE 115-*d* may identify that UE 115-*d* is a multi-SIM device that supports communications in accordance with at least a first subscription corresponding to a first SIM and a second subscription corresponding to a second SIM, where the communications are transmitted or received via a single transceiver of UE 115-*d*. In some cases, UE 115-*d* may operate in a SR-DSDS mode or a DR-DSDS mode. Additionally, the first data traffic may include a VoLTE service, and the first data traffic and the second data traffic may include a same RAT or different RATs (e.g., 4G/LTE and 5G/NR).

At 1510, UE 115-*d* may communicate, via the single transceiver, first data traffic using the first subscription, the first data traffic including packet-based voice traffic within a first data traffic stream.

At 1515, UE 115-*d* may identify that the first data traffic stream includes one or more durations of time in which the packet-based voice traffic is absent.

At 1520, UE 115-*d* may communicate, via the single transceiver and during the one or more durations of time, second data traffic using the second subscription. In some cases, the communications of the two types of data traffic may include communicating the first data traffic based on an active duration of a cDRX cycle for the first data traffic stream and communicating the second data traffic based on a sleep duration of the cDRX cycle for the first data traffic stream, where the sleep duration includes the one or more durations of time in which the packet-based voice traffic is absent. Accordingly, in some cases, UE 115-*d* may transition into the sleep duration based on an inactivity timer expiring while in a listen mode of the cDRX cycle. Additionally, the active duration may include a talk mode of the cDRX cycle, an SPS subframe, or a combination thereof, and the sleep duration may include an inactive portion of the cDRX cycle.

Additionally or alternatively, the communications of the two types of data traffic may include communicating the first data traffic based on an active duration of a SID frame for the first data traffic stream, where the first data traffic includes SID transmissions (e.g., SID_UPDATE frames) and may communicate the second data traffic based on a silence duration of the SID frame for the first data traffic stream, where the silence duration includes the one or more durations of time in which the packet-based voice traffic is absent.

In some cases, the communications of the two types of data traffic may include transmitting one or more uplink transmissions for the first data traffic and transmitting one or more uplink transmissions for the second data traffic by tuning the single transceiver away from the first data traffic stream (e.g., via a TA mechanism as described herein) during the one or more durations of time in which the packet-based voice traffic is absent.

At 1525, UE 115-*d* may monitor for one or more paging occasions for a third data traffic using the second subscription, the third data traffic including packet-based voice traffic (e.g., a second VoLTE service), an MT page reception, or a combination thereof. In some cases, one paging occasion of the one or more paging occasions may occurs at a same time as an active duration of the first data traffic. Accordingly, UE 115-*d* may receive downlink traffic for the first data traffic and downlink traffic for the second data traffic based on a DR-DSDS mode of UE 115-*d*. Additionally or alternatively, UE 115-*d* may transmit uplink traffic for the first data traffic during the active duration and may refrain from receiving downlink traffic associated with the one paging occasion for the third data traffic based on transmitting the uplink traffic for the first data traffic.

In some cases, when the one paging occasion of the one or more paging occasions occurs at a same time as an active duration of the first data traffic, UE 115-*d* may prioritize one of the first data traffic or the third data traffic based on a SR-DSDS mode of UE 115-*d*, communicate the prioritized data traffic, and refrain from communicating the data traffic that is not prioritized. In some cases, when the first data traffic is prioritized, UE 115-*d* may increase a priority of the third data traffic after a threshold value (e.g., X) of a number of communications for the third data traffic have been refrained from communications and may communicate the third data traffic based on the increased priority.

At 1530, UE 115-*d* may receive a paging indication for a third data traffic using the second subscription, the third data traffic including packet-based voice traffic and may place the first data traffic stream on hold based on receiving the paging indication (e.g., and based on a user of UE 115-*d* wanting to switch subscriptions).

Additionally or alternatively, UE 115-*d* may receive a paging message for a third data traffic during communications of the first data traffic, the third data traffic including a MT paging message indicating a MT call or SMS reception. Accordingly, UE 115-*d* may perform a connection establishment procedure for the third data traffic, activate a cDRX cycle for the third data traffic, and switch from communicating the first data traffic to communicating the third data traffic.

At 1535, UE 115-*d* may initiate a handover procedure from a first RAT to a second RAT for the first data traffic based on a CSFB procedure, a SVLTE procedure, or a combination thereof, the second RAT supporting fewer features than the first RAT (e.g., the first RAT may be 4G/LTE and the second RAT may be 3G, 2G, etc.). Accordingly, UE 115-*d* may suspend the second data traffic based on the handover procedure. In some cases, the handover procedure may include a SRVCC handover procedure.

Figure 16:
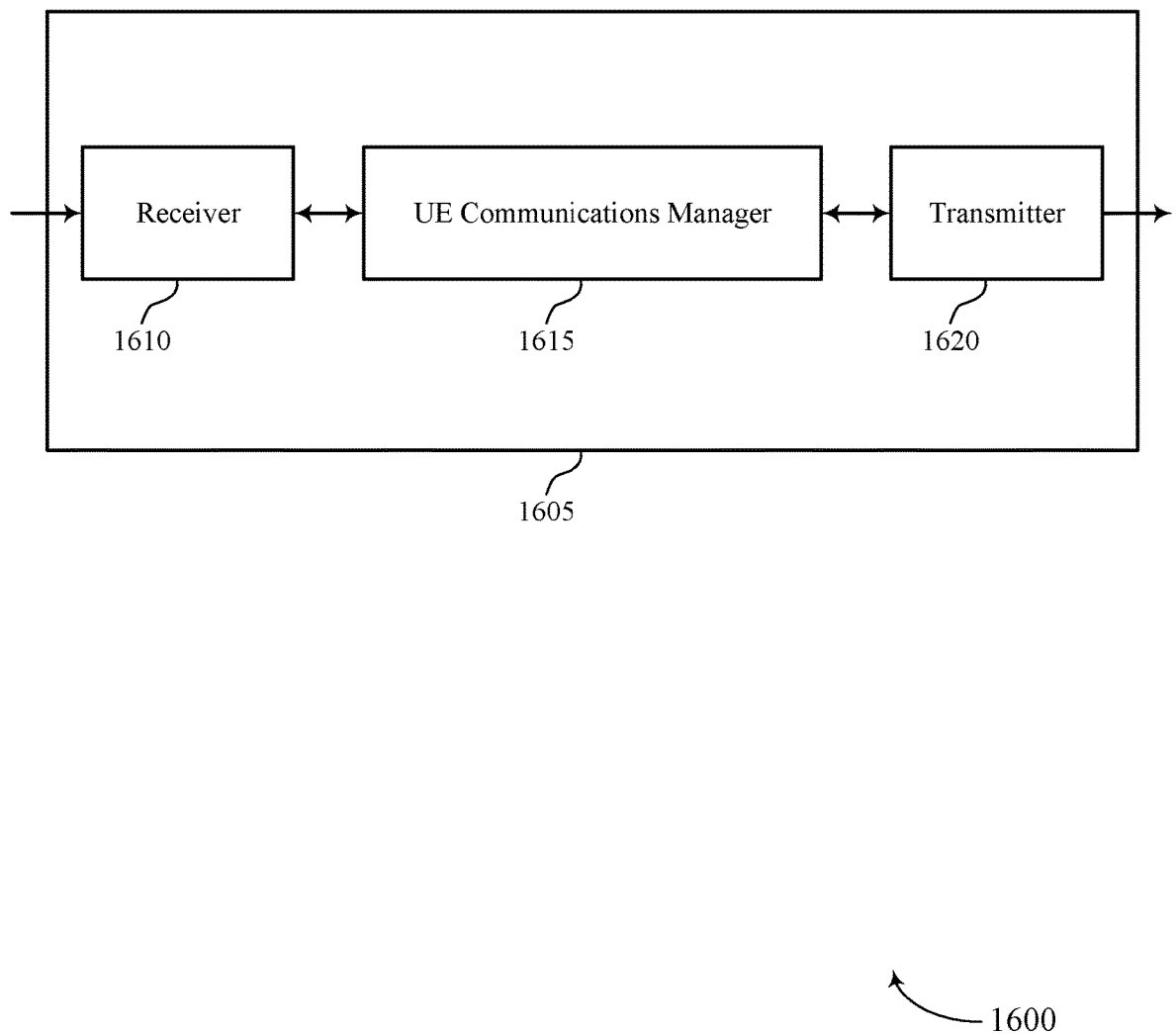
FIGS. 16 and 17 show block diagrams of devices that support data service and VoLTE in a multi-SIM system using a single transceiver in accordance with aspects of the present disclosure.

FIG. 16 shows a block diagram 1600 of a device 1605 that supports data service and VoLTE in a multi-SIM system using a single transceiver in accordance with aspects of the present disclosure. The device 1605 may be an example of aspects of a UE 115 as described herein. The device 1605 may include a receiver 1610, a UE communications manager 1615, and a transmitter 1620. The device 1605 may also include a processor. Each of these components may be in communication with one another (e.g., via one or more buses).

The receiver 1610 may receive information such as packets, user data, or control information associated with various information channels (e.g., control channels, data channels, and information related to data service and VoLTE support in a multi-SIM system using a single transceiver, etc.). Information may be passed on to other components of the device 1605. The receiver 1610 may be an example of aspects of the transceiver 1920 described with reference to FIG. 19. The receiver 1610 may utilize a single antenna or a set of antennas.

The UE communications manager 1615 may identify that the UE is a multi-SIM device that supports communications in accordance with at least a first subscription corresponding to a first SIM and a second subscription corresponding to a second SIM, where the communications are transmitted or received via a single transceiver of the UE. In some cases, the UE communications manager 1615 may communicate, via the single transceiver, first data traffic using the first subscription, the first data traffic including packet-based voice traffic within a first data traffic stream. Additionally, the UE communications manager 1615 may identify that the first data traffic stream includes one or more durations of time in which the packet-based voice traffic is absent. Accordingly, the UE communications manager 1615 may communicate, via the single transceiver and during the one or more durations of time, second data traffic using the second subscription. The UE communications manager 1615 may be an example of aspects of the UE communications manager 1910 described herein.

The UE communications manager 1615, or its sub-components, may be implemented in hardware, code (e.g., software or firmware) executed by a processor, or any combination thereof. If implemented in code executed by a processor, the functions of the UE communications manager 1615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 1615, or its sub-components, may be physically located at various positions, including being distributed such that portions of functions are implemented at different physical locations by one or more physical components. In some examples, the UE communications manager 1615, or its sub-components, may be a separate and distinct component in accordance with various aspects of the present disclosure. In some examples, the UE communications manager 1615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1620 may transmit signals generated by other components of the device 1605. In some examples, the transmitter 1620 may be collocated with a receiver 1610 in a transceiver module. For example, the transmitter 1620 may be an example of aspects of the transceiver 1920 described with reference to FIG. 19. The transmitter 1620 may utilize a single antenna or a set of antennas.

Figure 17:
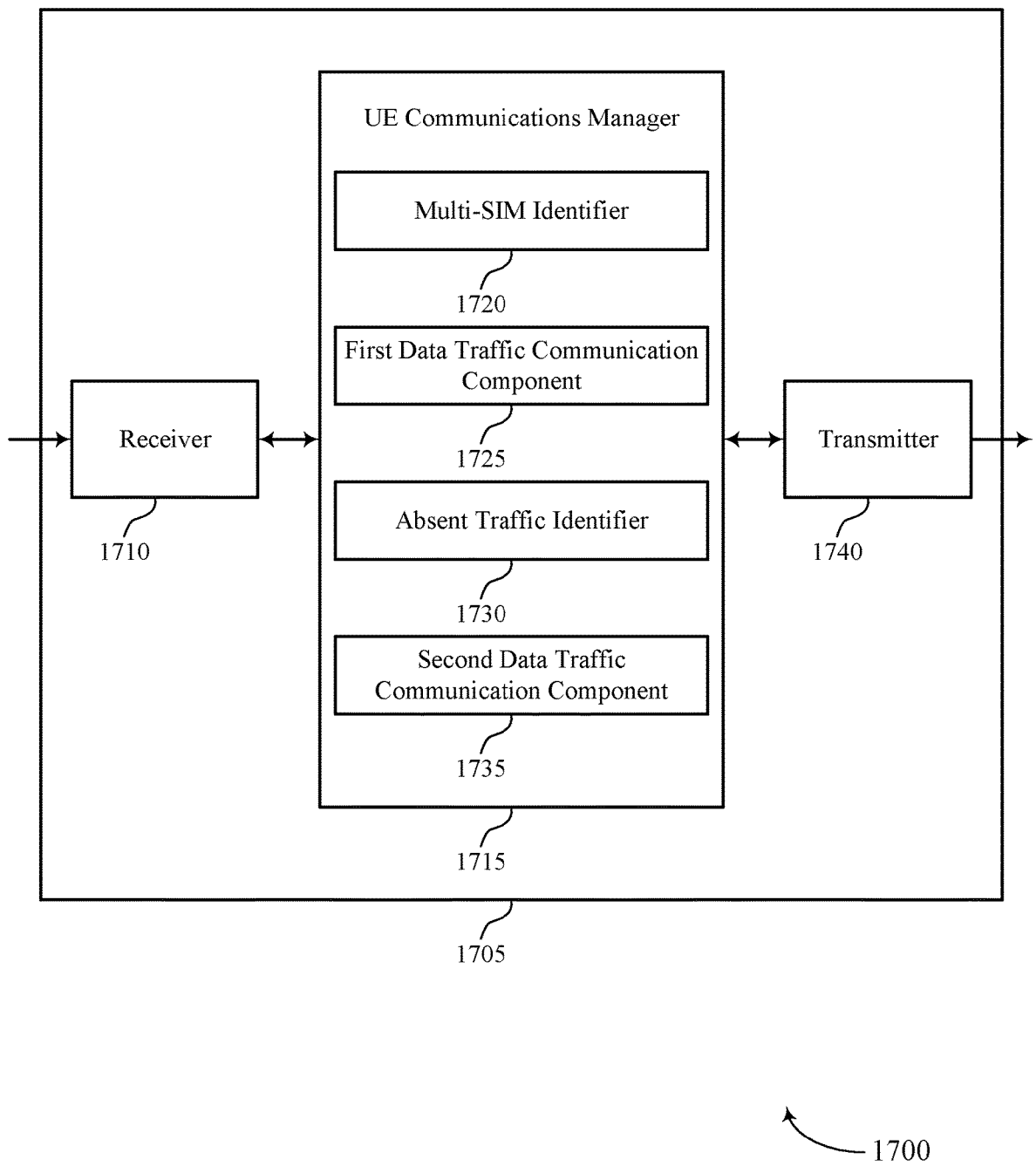

FIG. 17 shows a block diagram 1700 of a device 1705 that supports data service and VoLTE in a multi-SIM system using a single transceiver in accordance with aspects of the present disclosure. The device 1705 may be an example of aspects of a device 1605, or a UE 115 as described herein. The device 1705 may include a receiver 1710, a UE communications manager 1715, and a transmitter 1740. The device 1705 may also include a processor. Each of these components may be in communication with one another (e.g., via one or more buses).

The receiver 1710 may receive information such as packets, user data, or control information associated with various information channels (e.g., control channels, data channels, and information related to data service and VoLTE support in a multi-SIM system using a single transceiver, etc.). Information may be passed on to other components of the device 1705. The receiver 1710 may be an example of aspects of the transceiver 1920 described with reference to FIG. 19. The receiver 1710 may utilize a single antenna or a set of antennas.

The UE communications manager 1715 may be an example of aspects of the UE communications manager 1615 as described herein. The UE communications manager 1715 may include a multi-SIM identifier 1720, a first data traffic communication component 1725, an absent traffic identifier 1730, and a second data traffic communication component 1735. The UE communications manager 1715 may be an example of aspects of the UE communications manager 1910 described herein.

The multi-SIM identifier 1720 may identify that the UE is a multi-SIM device that supports communications in accordance with at least a first subscription corresponding to a first SIM and a second subscription corresponding to a second SIM, where the communications are transmitted or received via a single transceiver of the UE.

The first data traffic communication component 1725 may communicate, via the single transceiver, first data traffic using the first subscription, the first data traffic including packet-based voice traffic within a first data traffic stream.

The absent traffic identifier 1730 may identify that the first data traffic stream includes one or more durations of time in which the packet-based voice traffic is absent.

The second data traffic communication component 1735 may communicate, via the single transceiver and during the one or more durations of time, second data traffic using the second subscription.

The transmitter 1740 may transmit signals generated by other components of the device 1705. In some examples, the transmitter 1740 may be collocated with a receiver 1710 in a transceiver module. For example, the transmitter 1740 may be an example of aspects of the transceiver 1920 described with reference to FIG. 19. The transmitter 1740 may utilize a single antenna or a set of antennas.

Figure 18:
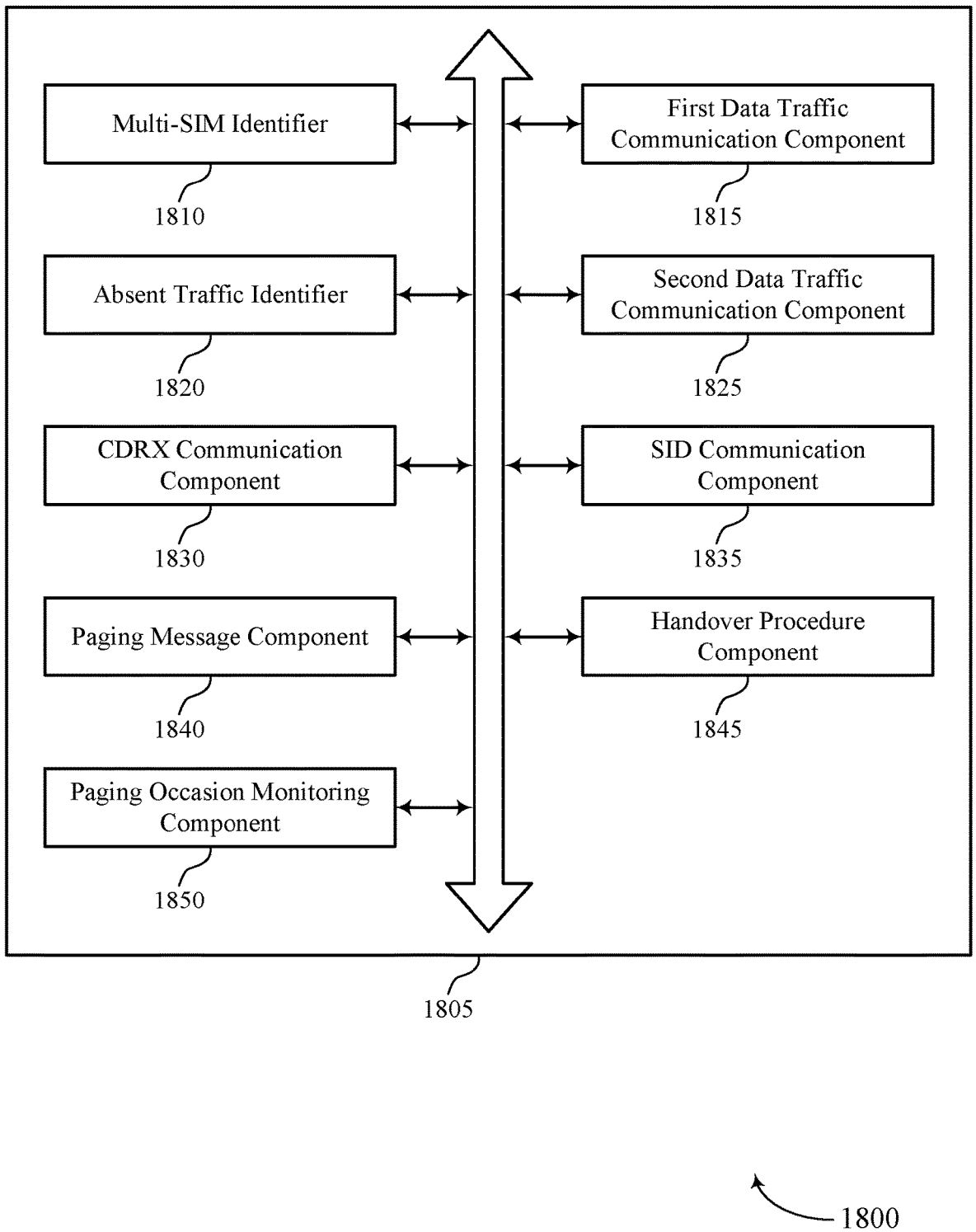
FIG. 18 shows a block diagram of a UE communications manager that supports data service and VoLTE in a multi-SIM system using a single transceiver in accordance with aspects of the present disclosure.

FIG. 18 shows a block diagram 1800 of a UE communications manager 1805 that supports data service and VoLTE in a multi-SIM system using a single transceiver in accordance with aspects of the present disclosure. The UE communications manager 1805 may be an example of aspects of a UE communications manager 1615, a UE communications manager 1715, or a UE communications manager 1910 described herein. The UE communications manager 1805 may include a multi-SIM identifier 1810, a first data traffic communication component 1815, an absent traffic identifier 1820, a second data traffic communication component 1825, a cDRX communication component 1830, a SID communication component 1835, a paging message component 1840, a handover procedure component 1845, and a paging occasion monitoring component 1850. Each of these modules may communicate, directly or indirectly, with one another (e.g., via one or more buses).

The multi-SIM identifier 1810 may identify that the UE is a multi-SIM device that supports communications in accordance with at least a first subscription corresponding to a first SIM and a second subscription corresponding to a second SIM, where the communications are transmitted or received via a single transceiver of the UE. In some cases, the UE may be operating in SR-DSDS mode. Additionally or alternatively, the UE may be operating in DR-DSDS mode. In some cases, the first data traffic may include a VoLTE service. Additionally, the first data traffic and the second data traffic may include a same RAT or different RATs.

The first data traffic communication component 1815 may communicate, via the single transceiver, first data traffic using the first subscription, the first data traffic including packet-based voice traffic within a first data traffic stream.

The absent traffic identifier 1820 may identify that the first data traffic stream includes one or more durations of time in which the packet-based voice traffic is absent.

The second data traffic communication component 1825 may communicate, via the single transceiver and during the one or more durations of time, second data traffic using the second subscription.

In some examples, the first data traffic communication component 1815 may transmit one or more uplink transmissions for the first data traffic. Accordingly, the second data traffic communication component 1825 may transmit one or more uplink transmissions for the second data traffic by tuning the single transceiver away from the first data traffic stream during the one or more durations of time in which the packet-based voice traffic is absent.

The cDRX communication component 1830 may communicate the first data traffic based on an active duration of a cDRX cycle for the first data traffic stream. Additionally, the cDRX communication component 1830 may communicate the second data traffic based on a sleep duration of the cDRX cycle for the first data traffic stream, where the sleep duration includes the one or more durations of time in which the packet-based voice traffic is absent. In some cases, the cDRX communication component 1830 may transition into the sleep duration based on an inactivity timer expiring while in a listen mode of the cDRX cycle. Additionally, the active duration may include a talk mode of the cDRX cycle, an SPS subframe, or a combination thereof, and the sleep duration may include an inactive portion of the cDRX cycle.

The SID communication component 1835 may communicate the first data traffic based on an active duration of a SID frame for the first data traffic stream, where the first data traffic includes SID transmissions. Additionally, the SID communication component 1835 may communicate the second data traffic based on a silence duration of the SID frame for the first data traffic stream, where the silence duration includes the one or more durations of time in which the packet-based voice traffic is absent.

The paging message component 1840 may receive a paging indication for a third data traffic using the second subscription, the third data traffic including packet-based voice traffic and may place the first data traffic stream on hold based on receiving the paging indication. Additionally or alternatively, the paging message component 1840 may receive a paging message for a third data traffic during communications of the first data traffic, the third data traffic including an MT paging message indicating an MT call or SMS reception, perform a connection establishment procedure (e.g., RRC connection establishment procedure) for the third data traffic, activate a cDRX cycle for the third data traffic, and switch from communicating the first data traffic to communicating the third data traffic.

The handover procedure component 1845 may initiate a handover procedure from a first RAT to a second RAT for the first data traffic based on a CSFB procedure, a SVLTE procedure, or a combination thereof, the second RAT supporting fewer features than the first RAT. Accordingly, the handover procedure component 1845 may suspend the second data traffic based on the handover procedure. In some cases, the handover procedure may include a SRVCC handover procedure.

The paging occasion monitoring component 1850 may monitor for one or more paging occasions for a third data traffic using the second subscription, the third data traffic including packet-based voice traffic, an MT page reception, or a combination thereof. In some cases, one paging occasion of the one or more paging occasions may occur at a same time as an active duration of the first data traffic. Accordingly, the paging occasion monitoring component 1850 may receive downlink traffic for the first data traffic and downlink traffic for the second data traffic based on a DR-DSDS mode of the UE. Additionally or alternatively, the paging occasion monitoring component 1850 may transmit uplink traffic for the first data traffic during the active duration and may refrain from receiving downlink traffic associated with the one paging occasion for the third data traffic based on transmitting the uplink traffic for the first data traffic.

Additionally or alternatively, when the one paging occasion of the one or more paging occasions occurs at a same time as an active duration of the first data traffic, the paging occasion monitoring component 1850 may prioritize one of the first data traffic or the third data traffic based on a SR-DSDS mode of the UE, communicate the prioritized data traffic, and may refrain from communicating the data traffic that is not prioritized. In some cases, the paging occasion monitoring component 1850 may increase a priority of the third data traffic after a threshold value of a number of communications for the third data traffic have been refrained from communications and may communicate the third data traffic based on the increased priority.

Figure 19:
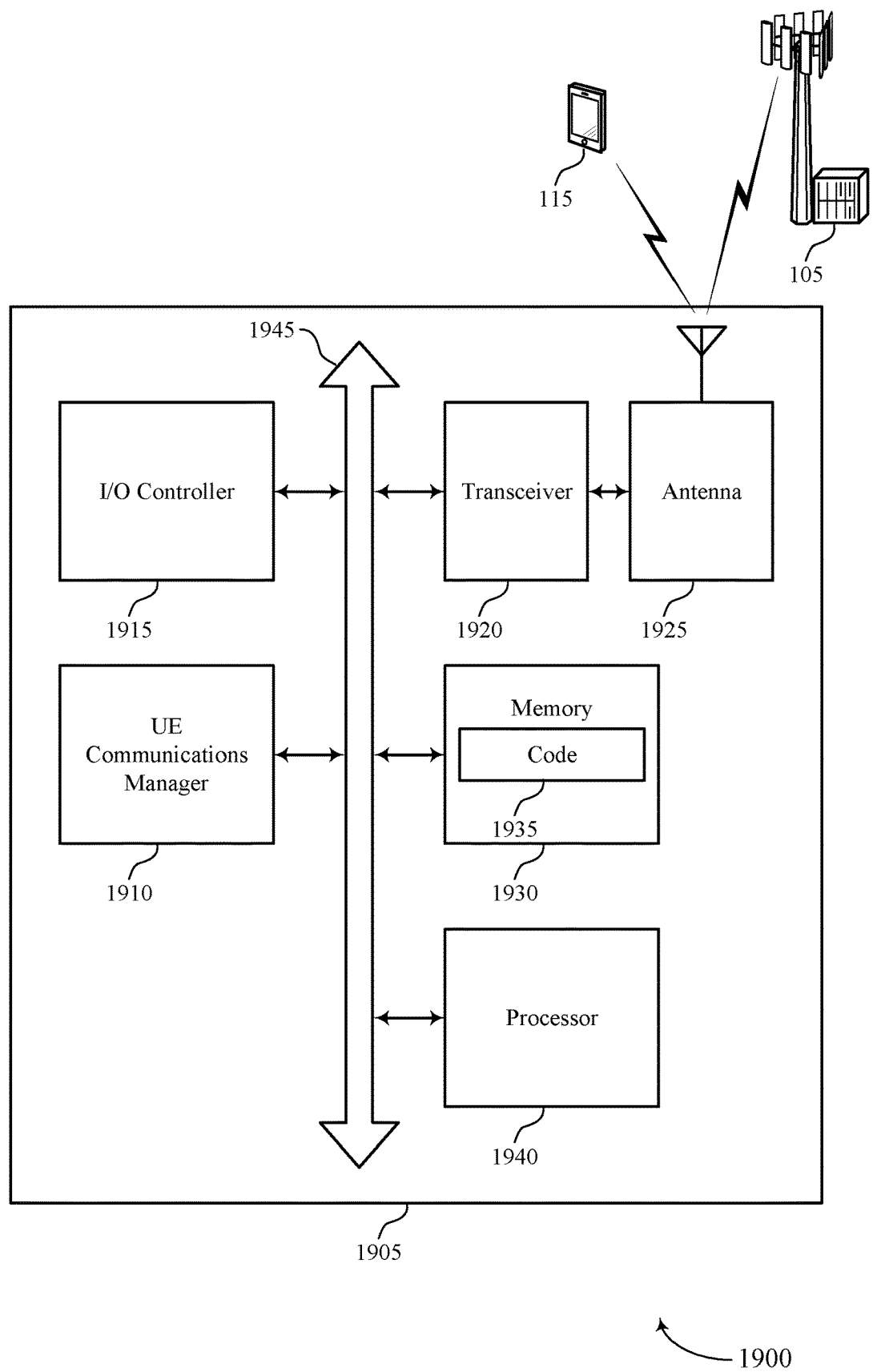
FIG. 19 shows a diagram of a system including a device that supports data service and VoLTE in a multi-SIM system using a single transceiver in accordance with aspects of the present disclosure.

FIG. 19 shows a diagram of a system 1900 including a device 1905 that supports data service and VoLTE in a multi-SIM system using a single transceiver in accordance with aspects of the present disclosure. The device 1905 may be an example of or include the components of device 1605, device 1705, or a UE 115 as described herein. The device 1905 may include components for bi-directional voice and data communications including components for transmitting and receiving communications, including a UE communications manager 1910, an I/O controller 1915, a transceiver 1920, an antenna 1925, memory 1930, and a processor 1940. These components may be coupled (e.g., in electronic communication) via one or more buses (e.g., bus 1945).

The UE communications manager 1910 may identify that the UE is a multi-SIM device that supports communications in accordance with at least a first subscription corresponding to a first SIM and a second subscription corresponding to a second SIM, where the communications are transmitted or received via a single transceiver of the UE. In some cases, the UE communications manager 1910 may communicate, via the single transceiver, first data traffic using the first subscription, the first data traffic including packet-based voice traffic within a first data traffic stream. Additionally, the UE communications manager 1910 may identify that the first data traffic stream includes one or more durations of time in which the packet-based voice traffic is absent. Accordingly, the UE communications manager 1910 may communicate, via the single transceiver and during the one or more durations of time, second data traffic using the second subscription.

The I/O controller 1915 may manage input and output signals for the device 1905. The I/O controller 1915 may also manage peripherals not integrated into the device 1905. In some cases, the I/O controller 1915 may represent a physical connection or port to an external peripheral. In some cases, the I/O controller 1915 may utilize an operating system such as iOS®, ANDROID®, MS-DOS®, MS-WINDOWS®, OS/2®, UNIX®, LINUX®, or another known operating system. In other cases, the I/O controller 1915 may represent or interact with a modem, a keyboard, a mouse, a touchscreen, or a similar device. In some cases, the I/O controller 1915 may be implemented as part of a processor. In some cases, a user may interact with the device 1905 via the I/O controller 1915 or via hardware components controlled by the I/O controller 1915.

The transceiver 1920 may communicate bi-directionally, via one or more antennas, wired, or wireless links as described above. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases the device may have more than one antenna 1925, which may be capable of concurrently transmitting or receiving multiple wireless transmissions.

The memory 1930 may include random-access memory (RAM) and read-only memory (ROM). The memory 1930 may store computer-readable, computer-executable code 1935 including instructions that, when executed, cause the processor to perform various functions described herein. In some cases, the memory 1930 may contain, among other things, a basic I/O system (BIOS) which may control basic hardware or software operation such as the interaction with peripheral components or devices.

The processor 1940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1940 may be configured to operate a memory array using a memory controller. In other cases, a memory controller may be integrated into the processor 1940. The processor 1940 may be configured to execute computer-readable instructions stored in a memory (e.g., the memory 1930) to cause the device 1905 to perform various functions (e.g., functions or tasks supporting data service and VoLTE in a multi-SIM system using a single transceiver).

The code 1935 may include instructions to implement aspects of the present disclosure, including instructions to support wireless communications. The code 1935 may be stored in a non-transitory computer-readable medium such as system memory or other type of memory. In some cases, the code 1935 may not be directly executable by the processor 1940 but may cause a computer (e.g., when compiled and executed) to perform functions described herein.

Figure 20:
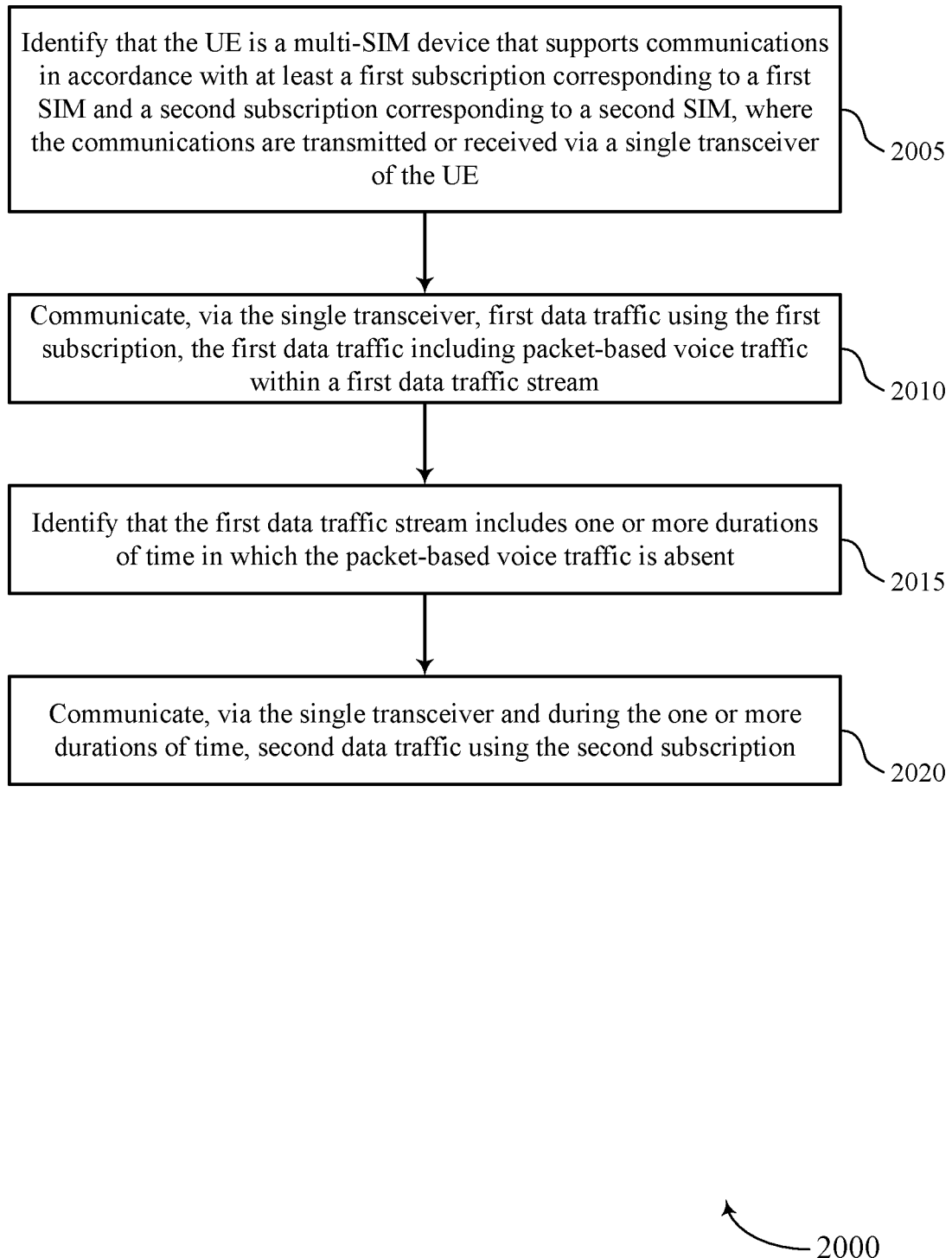
FIGS. 20 through 24 show flowcharts illustrating methods that support data service and VoLTE in a multi-SIM system using a single transceiver in accordance with aspects of the present disclosure.

FIG. 20 shows a flowchart illustrating a method 2000 that supports data service and VoLTE in a multi-SIM system using a single transceiver in accordance with aspects of the present disclosure. The operations of method 2000 may be implemented by a UE 115 or its components as described herein. For example, the operations of method 2000 may be performed by a UE communications manager as described with reference to FIGS. 16 through 19. In some examples, a UE may execute a set of instructions to control the functional elements of the UE to perform the functions described below. Additionally or alternatively, a UE may perform aspects of the functions described below using special-purpose hardware.

At 2005, the UE may identify that the UE is a multi-SIM device that supports communications in accordance with at least a first subscription corresponding to a first SIM and a second subscription corresponding to a second SIM, where the communications are transmitted or received via a single transceiver of the UE. The operations of 2005 may be performed according to the methods described herein. In some examples, aspects of the operations of 2005 may be performed by a multi-SIM identifier as described with reference to FIGS. 16 through 19.

At 2010, the UE may communicate, via the single transceiver, first data traffic using the first subscription, the first data traffic including packet-based voice traffic within a first data traffic stream. The operations of 2010 may be performed according to the methods described herein. In some examples, aspects of the operations of 2010 may be performed by a first data traffic communication component as described with reference to FIGS. 16 through 19.

At 2015, the UE may identify that the first data traffic stream includes one or more durations of time in which the packet-based voice traffic is absent. The operations of 2015 may be performed according to the methods described herein. In some examples, aspects of the operations of 2015 may be performed by an absent traffic identifier as described with reference to FIGS. 16 through 19.

At 2020, the UE may communicate, via the single transceiver and during the one or more durations of time, second data traffic using the second subscription. The operations of 2020 may be performed according to the methods described herein. In some examples, aspects of the operations of 2020 may be performed by a second data traffic communication component as described with reference to FIGS. 16 through 19.

Figure 21:
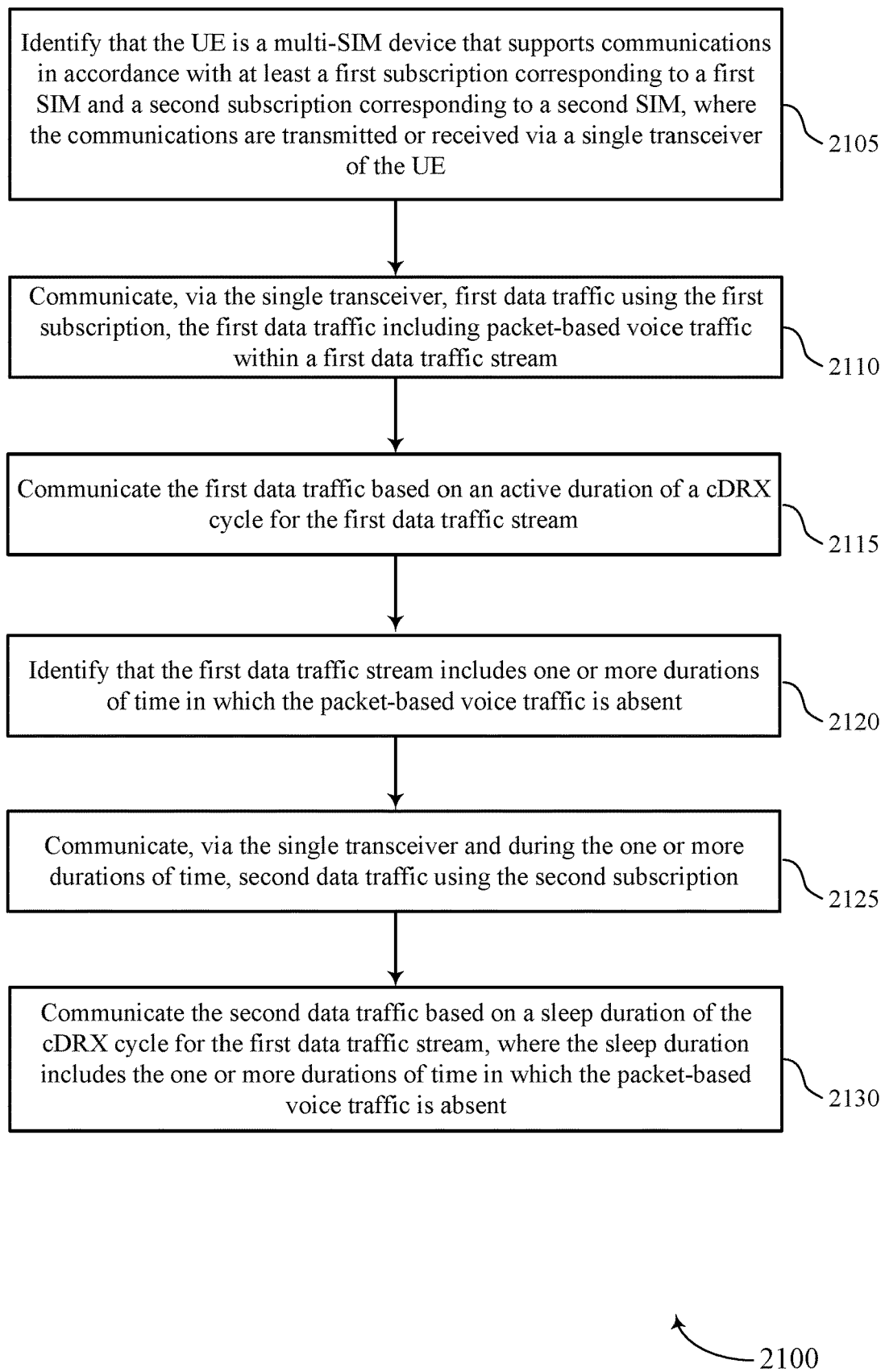

FIG. 21 shows a flowchart illustrating a method 2100 that supports data service and VoLTE in a multi-SIM system using a single transceiver in accordance with aspects of the present disclosure. The operations of method 2100 may be implemented by a UE 115 or its components as described herein. For example, the operations of method 2100 may be performed by a UE communications manager as described with reference to FIGS. 16 through 19. In some examples, a UE may execute a set of instructions to control the functional elements of the UE to perform the functions described below. Additionally or alternatively, a UE may perform aspects of the functions described below using special-purpose hardware.

At 2105, the UE may identify that the UE is a multi-SIM device that supports communications in accordance with at least a first subscription corresponding to a first SIM and a second subscription corresponding to a second SIM, where the communications are transmitted or received via a single transceiver of the UE. The operations of 2105 may be performed according to the methods described herein. In some examples, aspects of the operations of 2105 may be performed by a multi-SIM identifier as described with reference to FIGS. 16 through 19.

At 2110, the UE may communicate, via the single transceiver, first data traffic using the first subscription, the first data traffic including packet-based voice traffic within a first data traffic stream. The operations of 2110 may be performed according to the methods described herein. In some examples, aspects of the operations of 2110 may be performed by a first data traffic communication component as described with reference to FIGS. 16 through 19.

At 2115, the UE may communicate the first data traffic based on an active duration of a cDRX cycle for the first data traffic stream. The operations of 2115 may be performed according to the methods described herein. In some examples, aspects of the operations of 2115 may be performed by a cDRX communication component as described with reference to FIGS. 16 through 19.

At 2120, the UE may identify that the first data traffic stream includes one or more durations of time in which the packet-based voice traffic is absent. The operations of 2120 may be performed according to the methods described herein. In some examples, aspects of the operations of 2120 may be performed by an absent traffic identifier as described with reference to FIGS. 16 through 19.

At 2125, the UE may communicate, via the single transceiver and during the one or more durations of time, second data traffic using the second subscription. The operations of 2125 may be performed according to the methods described herein. In some examples, aspects of the operations of 2125 may be performed by a second data traffic communication component as described with reference to FIGS. 16 through 19.

At 2130, the UE may communicate the second data traffic based on a sleep duration of the cDRX cycle for the first data traffic stream, where the sleep duration includes the one or more durations of time in which the packet-based voice traffic is absent. The operations of 2130 may be performed according to the methods described herein. In some examples, aspects of the operations of 2130 may be performed by a cDRX communication component as described with reference to FIGS. 16 through 19.

Figure 22:
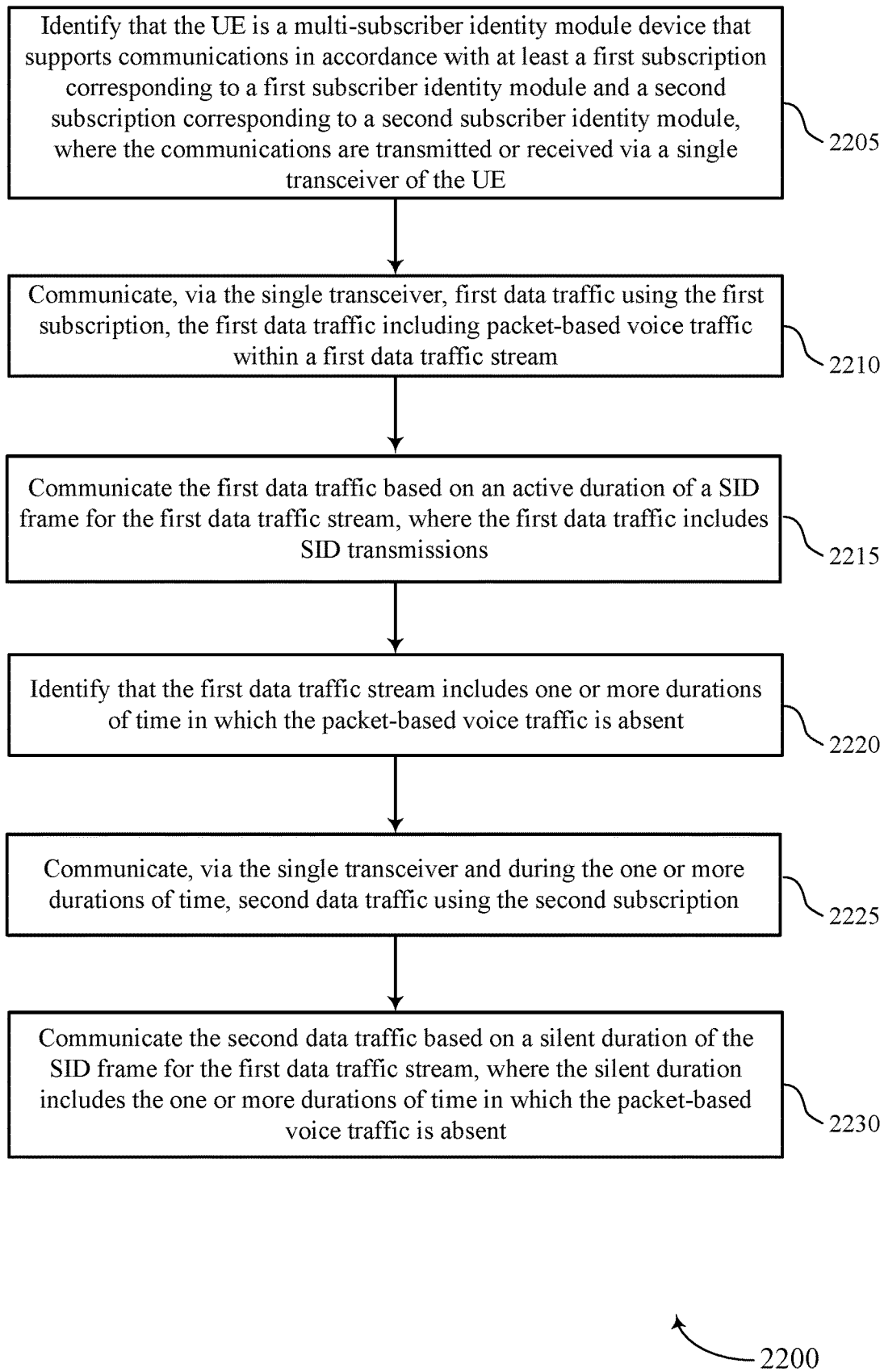

FIG. 22 shows a flowchart illustrating a method 2200 that supports data service and VoLTE in a multi-SIM system using a single transceiver in accordance with aspects of the present disclosure. The operations of method 2200 may be implemented by a UE 115 or its components as described herein. For example, the operations of method 2200 may be performed by a UE communications manager as described with reference to FIGS. 16 through 19. In some examples, a UE may execute a set of instructions to control the functional elements of the UE to perform the functions described below. Additionally or alternatively, a UE may perform aspects of the functions described below using special-purpose hardware.

At 2205, the UE may identify that the UE is a multi-SIM device that supports communications in accordance with at least a first subscription corresponding to a first SIM and a second subscription corresponding to a second SIM, where the communications are transmitted or received via a single transceiver of the UE. The operations of 2205 may be performed according to the methods described herein. In some examples, aspects of the operations of 2205 may be performed by a multi-SIM identifier as described with reference to FIGS. 16 through 19.

At 2210, the UE may communicate, via the single transceiver, first data traffic using the first subscription, the first data traffic including packet-based voice traffic within a first data traffic stream. The operations of 2210 may be performed according to the methods described herein. In some examples, aspects of the operations of 2210 may be performed by a first data traffic communication component as described with reference to FIGS. 16 through 19.

At 2215, the UE may communicate the first data traffic based on an active duration of a SID frame for the first data traffic stream, where the first data traffic includes SID transmissions. The operations of 2215 may be performed according to the methods described herein. In some examples, aspects of the operations of 2215 may be performed by a SID communication component as described with reference to FIGS. 16 through 19.

At 2220, the UE may identify that the first data traffic stream includes one or more durations of time in which the packet-based voice traffic is absent. The operations of 2220 may be performed according to the methods described herein. In some examples, aspects of the operations of 2220 may be performed by an absent traffic identifier as described with reference to FIGS. 16 through 19.

At 2225, the UE may communicate, via the single transceiver and during the one or more durations of time, second data traffic using the second subscription. The operations of 2225 may be performed according to the methods described herein. In some examples, aspects of the operations of 2225 may be performed by a second data traffic communication component as described with reference to FIGS. 16 through 19.

At 2230, the UE may communicate the second data traffic based on a silence duration of the SID frame for the first data traffic stream, where the silence duration includes the one or more durations of time in which the packet-based voice traffic is absent. The operations of 2230 may be performed according to the methods described herein. In some examples, aspects of the operations of 2230 may be performed by a SID communication component as described with reference to FIGS. 16 through 19.

Figure 23:
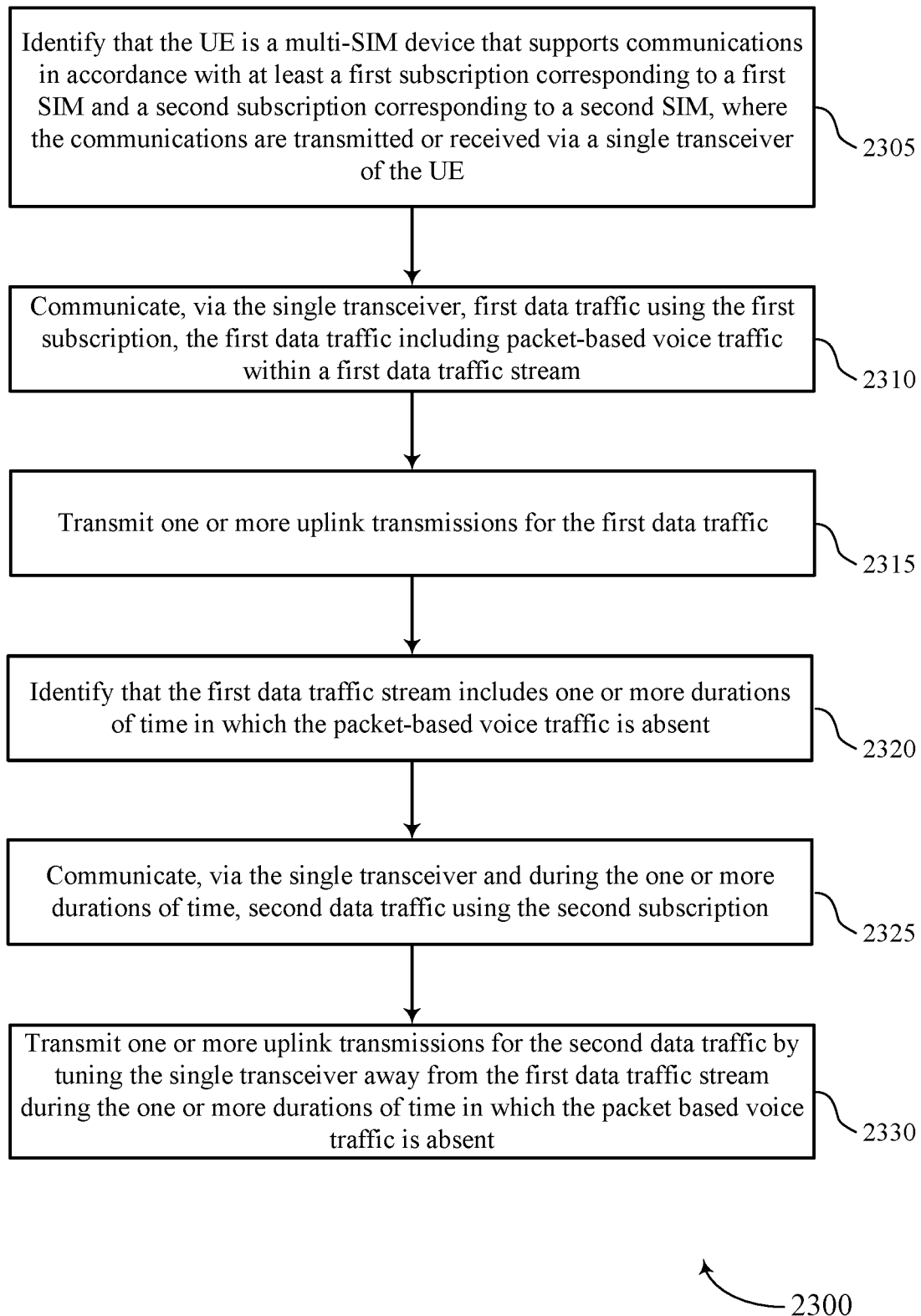

FIG. 23 shows a flowchart illustrating a method 2300 that supports data service and VoLTE in a multi-SIM system using a single transceiver in accordance with aspects of the present disclosure. The operations of method 2300 may be implemented by a UE 115 or its components as described herein. For example, the operations of method 2300 may be performed by a UE communications manager as described with reference to FIGS. 16 through 19. In some examples, a UE may execute a set of instructions to control the functional elements of the UE to perform the functions described below. Additionally or alternatively, a UE may perform aspects of the functions described below using special-purpose hardware.

At 2305, the UE may identify that the UE is a multi-SIM device that supports communications in accordance with at least a first subscription corresponding to a first SIM and a second subscription corresponding to a second SIM, where the communications are transmitted or received via a single transceiver of the UE. The operations of 2305 may be performed according to the methods described herein. In some examples, aspects of the operations of 2305 may be performed by a multi-SIM identifier as described with reference to FIGS. 16 through 19.

At 2310, the UE may communicate, via the single transceiver, first data traffic using the first subscription, the first data traffic including packet-based voice traffic within a first data traffic stream. The operations of 2310 may be performed according to the methods described herein. In some examples, aspects of the operations of 2310 may be performed by a first data traffic communication component as described with reference to FIGS. 16 through 19.

At 2315, the UE may transmit one or more uplink transmissions for the first data traffic. The operations of 2315 may be performed according to the methods described herein. In some examples, aspects of the operations of 2315 may be performed by a first data traffic communication component as described with reference to FIGS. 16 through 19.

At 2320, the UE may identify that the first data traffic stream includes one or more durations of time in which the packet-based voice traffic is absent. The operations of 2320 may be performed according to the methods described herein. In some examples, aspects of the operations of 2320 may be performed by an absent traffic identifier as described with reference to FIGS. 16 through 19.

At 2325, the UE may communicate, via the single transceiver and during the one or more durations of time, second data traffic using the second subscription. The operations of 2325 may be performed according to the methods described herein. In some examples, aspects of the operations of 2325 may be performed by a second data traffic communication component as described with reference to FIGS. 16 through 19.

At 2330, the UE may transmit one or more uplink transmissions for the second data traffic by tuning the single transceiver away from the first data traffic stream during the one or more durations of time in which the packet-based voice traffic is absent. The operations of 2330 may be performed according to the methods described herein. In some examples, aspects of the operations of 2330 may be performed by a second data traffic communication component as described with reference to FIGS. 16 through 19.

Figure 24:
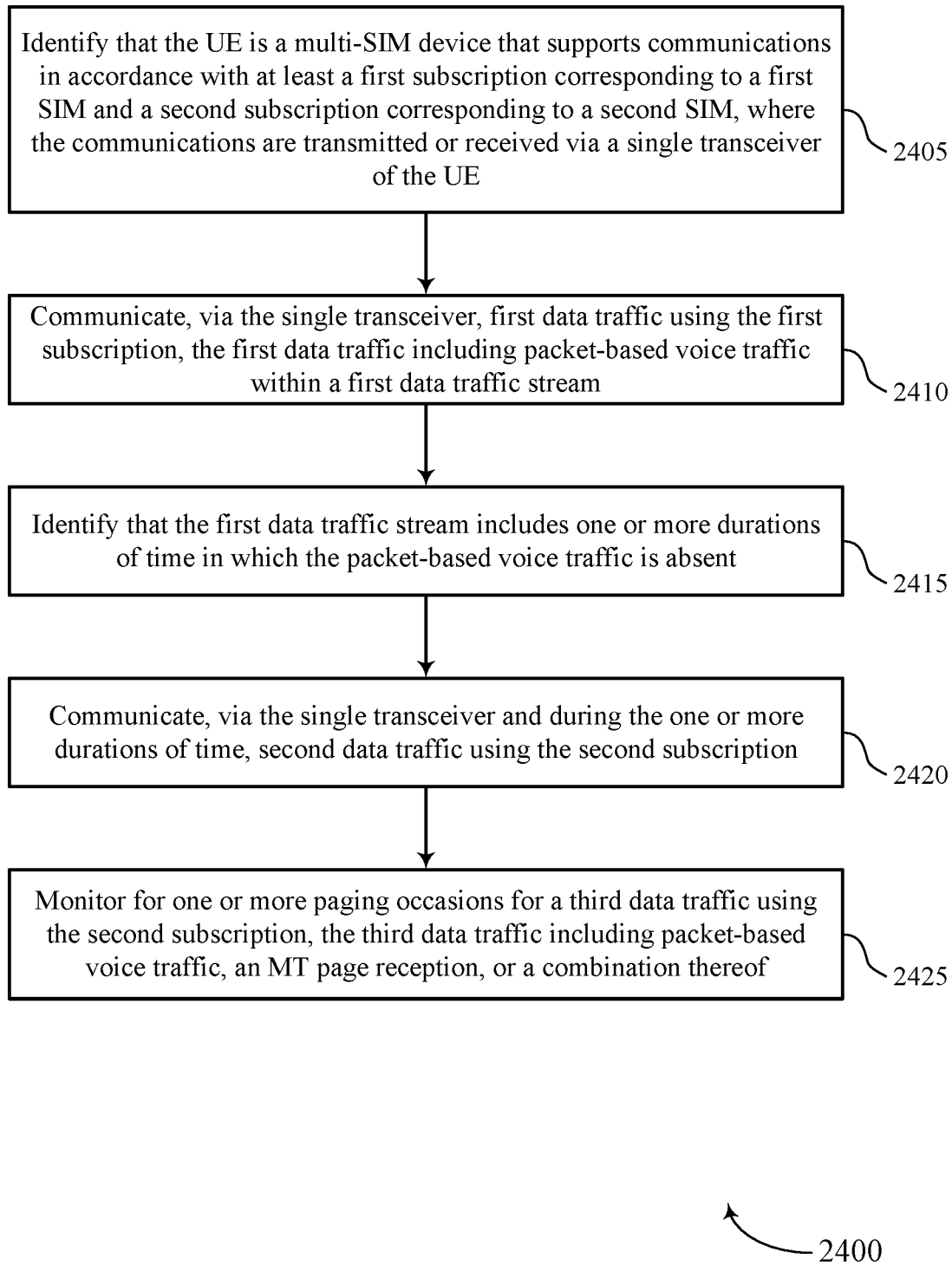

FIG. 24 shows a flowchart illustrating a method 2400 that supports data service and VoLTE in a multi-SIM system using a single transceiver in accordance with aspects of the present disclosure. The operations of method 2400 may be implemented by a UE 115 or its components as described herein. For example, the operations of method 2400 may be performed by a UE communications manager as described with reference to FIGS. 16 through 19. In some examples, a UE may execute a set of instructions to control the functional elements of the UE to perform the functions described below. Additionally or alternatively, a UE may perform aspects of the functions described below using special-purpose hardware.

At 2405, the UE may identify that the UE is a multi-SIM device that supports communications in accordance with at least a first subscription corresponding to a first SIM and a second subscription corresponding to a second SIM, where the communications are transmitted or received via a single transceiver of the UE. The operations of 2405 may be performed according to the methods described herein. In some examples, aspects of the operations of 2405 may be performed by a multi-SIM identifier as described with reference to FIGS. 16 through 19.

At 2410, the UE may communicate, via the single transceiver, first data traffic using the first subscription, the first data traffic including packet-based voice traffic within a first data traffic stream. The operations of 2410 may be performed according to the methods described herein. In some examples, aspects of the operations of 2410 may be performed by a first data traffic communication component as described with reference to FIGS. 16 through 19.

At 2415, the UE may identify that the first data traffic stream includes one or more durations of time in which the packet-based voice traffic is absent. The operations of 2415 may be performed according to the methods described herein. In some examples, aspects of the operations of 2415 may be performed by an absent traffic identifier as described with reference to FIGS. 16 through 19.

At 2420, the UE may communicate, via the single transceiver and during the one or more durations of time, second data traffic using the second subscription. The operations of 2420 may be performed according to the methods described herein. In some examples, aspects of the operations of 2420 may be performed by a second data traffic communication component as described with reference to FIGS. 16 through 19.

At 2425, the UE may monitor for one or more paging occasions for a third data traffic using the second subscription, the third data traffic including packet-based voice traffic, a mobile terminal page reception, or a combination thereof. The operations of 2425 may be performed according to the methods described herein. In some examples, aspects of the operations of 2425 may be performed by a paging occasion monitoring component as described with reference to FIGS. 16 through 19.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   identifying that the UE is a multi-subscriber identity module device that supports communications in accordance with at least a first subscription corresponding to a first subscriber identity module and a second subscription corresponding to a second subscriber identity module, wherein the communications are transmitted or received via a single transceiver of the UE;
   communicating, via the single transceiver, first data traffic using the first subscription, based at least in part on an active duration of a connected mode discontinuous reception cycle for the first data traffic stream, the first data traffic including packet-based voice traffic within a first data traffic stream;
   identifying that the first data traffic stream includes one or more durations of time in which the packet-based voice traffic is absent; and
   communicating, via the single transceiver and during the one or more durations of time, second data traffic using the second subscription, based at least in part on a sleep duration of the connected mode discontinuous reception cycle for the first data traffic stream, wherein the sleep duration includes the one or more durations of time in which the packet-based voice traffic is absent.

2. The method of claim 1, further comprising:
   transitioning into the sleep duration based at least in part on an inactivity timer expiring while in a listen mode of the connected mode discontinuous reception cycle.

3. The method of claim 1, wherein the active duration comprises a talk mode of the connected mode discontinuous reception cycle, a semi-persistent scheduling subframe, or a combination thereof, and the sleep duration comprises an inactive portion of the connected mode discontinuous reception cycle.

4. The method of claim 1, wherein communicating the second data traffic using the second subscription comprises:
   monitoring for one or more paging occasions for a third data traffic using the second subscription, the third data traffic comprising packet-based voice traffic, a mobile terminal page reception, or a combination thereof.

5. The method of claim 4, wherein one paging occasion of the one or more paging occasions occurs at a same time as an active duration of the first data traffic, the method further comprising:

receiving downlink traffic for the first data traffic and downlink traffic for the second data traffic based at least in part on a dual receive dual service dual standby mode of the UE.

6. The method of claim 4, wherein one paging occasion of the one or more paging occasions occurs at a same time as an active duration of the first data traffic, the method further comprising:
transmitting uplink traffic for the first data traffic during the active duration; and
refraining from receiving downlink traffic associated with the one paging occasion for the third data traffic based at least in part on transmitting the uplink traffic for the first data traffic.

7. The method of claim 4, wherein one paging occasion of the one or more paging occasions occurs at a same time as an active duration of the first data traffic, the method further comprising:
prioritizing one of the first data traffic or the third data traffic based at least in part on a single receive dual service dual standby mode of the UE;
communicating the prioritized data traffic; and
refraining from communicating the data traffic that is not prioritized.

8. The method of claim 7, wherein the first data traffic is prioritized, the method further comprising:
increasing a priority of the third data traffic after a threshold value of a number of communications for the third data traffic have been refrained from communications; and
communicating the third data traffic based at least in part on the increased priority.

9. The method of claim 1, further comprising:
receiving a paging message for a third data traffic during communications of the first data traffic, the third data traffic comprising a mobile terminal paging message indicating a mobile terminal call or short messaging service reception;
performing a connection establishment procedure for the third data traffic;
activating a connected mode discontinuous reception cycle for the third data traffic; and
switching from communicating the first data traffic to communicating the third data traffic.

10. The method of claim 1, wherein the UE is operating in single receive dual service dual standby mode.

11. The method of claim 1, wherein the UE is operating in dual receive dual service dual standby mode.

12. The method of claim 1, wherein the first data traffic comprises a voice over long term evolution service.

13. The method of claim 1, wherein the first data traffic and the second data traffic comprise a same radio access technology or different radio access technologies.

14. A method for wireless communications at a user equipment (UE), comprising:
identifying that the UE is a multi-subscriber identity module device that supports communications in accordance with at least a first subscription corresponding to a first subscriber identity module and a second subscription corresponding to a second subscriber identity module, wherein the communications are transmitted or received via a single transceiver of the UE;
communicating, via the single transceiver, first data traffic using the first subscription, based at least in part on an active duration of a silence insertion descriptor frame for the first data traffic stream, wherein the first data traffic comprises silence insertion descriptor transmissions, the first data traffic including packet-based voice traffic within a first data traffic stream;
identifying that the first data traffic stream includes one or more durations of time in which the packet-based voice traffic is absent; and
communicating, via the single transceiver and during the one or more durations of time, second data traffic using the second subscription, based at least in part on a silence duration of the silence insertion descriptor frame for the first data traffic stream, wherein the silence duration includes the one or more durations of time in which the packet-based voice traffic is absent.

15. A method for wireless communications at a user equipment (UE), comprising:
identifying that the UE is a multi-subscriber identity module device that supports communications in accordance with at least a first subscription corresponding to a first subscriber identity module and a second subscription corresponding to a second subscriber identity module, wherein the communications are transmitted or received via a single transceiver of the UE;
communicating, via the single transceiver, first data traffic using the first subscription, the first data traffic including packet-based voice traffic within a first data traffic stream;
identifying that the first data traffic stream includes one or more durations of time in which the packet-based voice traffic is absent;
communicating, via the single transceiver and during the one or more durations of time, second data traffic using the second subscription;
receiving a paging indication for a third data traffic using the second subscription, the third data traffic comprising packet-based voice traffic; and
placing the first data traffic stream on hold based at least in part on receiving the paging indication.

16. A method for wireless communications at a user equipment (UE), comprising:
identifying that the UE is a multi-subscriber identity module device that supports communications in accordance with at least a first subscription corresponding to a first subscriber identity module and a second subscription corresponding to a second subscriber identity module, wherein the communications are transmitted or received via a single transceiver of the UE;
communicating, via the single transceiver, first data traffic using the first subscription, the first data traffic including packet-based voice traffic within a first data traffic stream;
identifying that the first data traffic stream includes one or more durations of time in which the packet-based voice traffic is absent;
communicating, via the single transceiver and during the one or more durations of time, second data traffic using the second subscription;
transmitting one or more uplink transmissions for the first data traffic; and
transmitting one or more uplink transmissions for the second data traffic by tuning the single transceiver away from the first data traffic stream during the one or more durations of time in which the packet-based voice traffic is absent.

17. A method for wireless communications at a user equipment (UE), comprising:
identifying that the UE is a multi-subscriber identity module device that supports communications in accordance with at least a first subscription corresponding to a first subscriber identity module and a second subscription corresponding to a second subscriber identity module, wherein the communications are transmitted or received via a single transceiver of the UE;

communicating, via the single transceiver, first data traffic using the first subscription, the first data traffic including packet-based voice traffic within a first data traffic stream;

identifying that the first data traffic stream includes one or more durations of time in which the packet-based voice traffic is absent;

communicating, via the single transceiver and during the one or more durations of time, second data traffic using the second subscription;

initiating a handover procedure from a first radio access technology to a second radio access technology for the first data traffic based at least in part on a circuit switched fallback procedure, a simultaneous voice and long term evolution procedure, or a combination thereof, the second radio access technology supporting fewer features than the first radio access technology; and suspending the second data traffic based at least in part on the handover procedure.

18. The method of claim 17, wherein the handover procedure comprises a single radio voice call continuity handover procedure.

19. An apparatus for wireless communications at a user equipment (UE), comprising:
a processor,
memory coupled with the processor; and
instructions stored in the memory and executable by the processor to cause the apparatus to:
identify that the UE is a multi-subscriber identity module device that supports communications in accordance with at least a first subscription corresponding to a first subscriber identity module and a second subscription corresponding to a second subscriber identity module, wherein the communications are transmitted or received via a single transceiver of the UE;
communicate, via the single transceiver, first data traffic using the first subscription, based at least in part on an active duration of a silence insertion descriptor frame for the first data traffic stream, wherein the first data traffic comprises silence insertion descriptor transmissions, the first data traffic including packet-based voice traffic within a first data traffic stream;
identify that the first data traffic stream includes one or more durations of time in which the packet-based voice traffic is absent; and
communicate, via the single transceiver and during the one or more durations of time, second data traffic using the second subscription, based at least in part on a silence duration of the silence insertion descriptor frame for the first data traffic stream, wherein the silence duration includes the one or more durations of time in which the packet-based voice traffic is absent.

20. The apparatus of claim 19, wherein the instructions to communicate the second data traffic using the second subscription are executable by the processor to cause the apparatus to:
monitor for one or more paging occasions for a third data traffic using the second subscription, the third data traffic comprising packet-based voice traffic, a mobile terminal page reception, or a combination thereof.

21. The apparatus of claim 20, wherein one paging occasion of the one or more paging occasions occurs at a same time as an active duration of the first data traffic, and the instructions are further executable by the processor to cause the apparatus to:
prioritize one of the first data traffic or the third data traffic based at least in part on a single receive dual service dual standby mode of the UE;
communicate the prioritized data traffic; and
refrain from communicating the data traffic that is not prioritized.

22. The apparatus of claim 21, wherein the first data traffic is prioritized, and the instructions are further executable by the processor to cause the apparatus to:
increase a priority of the third data traffic after a threshold value of a number of communications for the third data traffic have been refrained from communications; and
communicate the third data traffic based at least in part on the increased priority.

23. The apparatus of claim 19, wherein the instructions are further executable by the processor to cause the apparatus to:
receive a paging message for a third data traffic during communications of the first data traffic, the third data traffic comprising a mobile terminal paging message indicating a mobile terminal call or short messaging service reception;
perform a connection establishment procedure for the third data traffic;
activate a connected mode discontinuous reception cycle for the third data traffic; and
switch from communicating the first data traffic to communicating the third data traffic.

24. An apparatus for wireless communications at a user equipment (UE), comprising:
a processor,
memory coupled with the processor; and
instructions stored in the memory and executable by the processor to cause the apparatus to:
identify that the UE is a multi-subscriber identity module device that supports communications in accordance with at least a first subscription corresponding to a first subscriber identity module and a second subscription corresponding to a second subscriber identity module, wherein the communications are transmitted or received via a single transceiver of the UE;
communicate, via the single transceiver, first data traffic, based at least in part on an active duration of a connected mode discontinuous reception cycle for the first data traffic stream, using the first subscription, the first data traffic including packet-based voice traffic within a first data traffic stream;
identify that the first data traffic stream includes one or more durations of time in which the packet-based voice traffic is absent; and
communicate, via the single transceiver and during the one or more durations of time, second data traffic, based at least in part on a sleep duration of the connected mode discontinuous reception cycle for the first data traffic stream, wherein the sleep duration includes the one or more durations of time in which the packet-based voice traffic is absent, using the second subscription.

25. An apparatus for wireless communications at a user equipment (UE), comprising:
a processor, memory coupled with the processor; and instructions stored in the memory and executable by the processor to cause the apparatus to:

identify that the UE is a multi-subscriber identity module device that supports communications in accordance with at least a first subscription corresponding to a first subscriber identity module and a second subscription corresponding to a second subscriber identity module, wherein the communications are transmitted or received via a single transceiver of the UE;

communicate, via the single transceiver, first data traffic using the first subscription, the first data traffic including packet-based voice traffic within a first data traffic stream;

identify that the first data traffic stream includes one or more durations of time in which the packet-based voice traffic is absent;

communicate, via the single transceiver and during the one or more durations of time, second data traffic using the second subscription;

receive a paging indication for a third data traffic using the second subscription, the third data traffic comprising packet-based voice traffic; and place the first data traffic stream on hold based at least in part on receiving the paging indication.

26. An apparatus for wireless communications at a user equipment (UE), comprising:

a processor, memory coupled with the processor; and instructions stored in the memory and executable by the processor to cause the apparatus to:

identify that the UE is a multi-subscriber identity module device that supports communications in accordance with at least a first subscription corresponding to a first subscriber identity module and a second subscription corresponding to a second subscriber identity module, wherein the communications are transmitted or received via a single transceiver of the UE;

communicate, via the single transceiver, first data traffic using the first subscription, the first data traffic including packet-based voice traffic within a first data traffic stream;

identify that the first data traffic stream includes one or more durations of time in which the packet-based voice traffic is absent;

communicate, via the single transceiver and during the one or more durations of time, second data traffic using the second subscription;

transmit one or more uplink transmissions for the first data traffic; and transmit one or more uplink transmissions for the second data traffic by tuning the single transceiver away from the first data traffic stream during the one or more durations of time in which the packet-based voice traffic is absent.

* * * * *